(12) United States Patent  
Jeon

(10) Patent No.: US 8,384,644 B2
(45) Date of Patent: Feb. 26, 2013

(54) DISPLAY DEVICE AND DRIVING APPARATUS

(75) Inventor: Jin Jeon, Suwon-si (KR)

(73) Assignee: Samsung Display Co., Ltd. (KR)

( * ) Notice: Subject to any disclaimer, the term of this patent is extended or adjusted under 35 U.S.C. 154(b) by 125 days.

(21) Appl. No.: 13/016,802

(22) Filed: Jan. 28, 2011

(65) Prior Publication Data

US 2011/0134096 A1     Jun. 9, 2011

Related U.S. Application Data

(63) Continuation of application No. 11/648,372, filed on Dec. 28, 2006, now Pat. No. 7,907,107.

(30) Foreign Application Priority Data

Jan. 26, 2006 (KR) .................. 10-2006-0008148

(51) Int. Cl.
     *G09G 3/36*     (2006.01)

(52) U.S. Cl. ............. 345/98; 345/87; 345/100; 345/204

(58) Field of Classification Search ............ 345/87–100, 345/204, 690
See application file for complete search history.

(56) References Cited

U.S. PATENT DOCUMENTS

| | | | |
|---|---|---|---|
| 6,229,516 B1 | 5/2001 | Kim et al. | |
| 7,652,649 B2 | 1/2010 | Huan | |
| 7,705,819 B2 | 4/2010 | Choi et al. | |
| 2003/0218178 A1 | 11/2003 | Kim | |
| 2004/0041771 A1 | 3/2004 | Murase et al. | |
| 2004/0041777 A1 | 3/2004 | Toyozawa et al. | |
| 2004/0125065 A1 | 7/2004 | Park et al. | |
| 2005/0057465 A1 | 3/2005 | Yu | |
| 2005/0151715 A1 | 7/2005 | Chegal | |
| 2006/0007218 A1* | 1/2006 | Miyake et al. | 345/204 |
| 2006/0114208 A1* | 6/2006 | Senda | 345/90 |
| 2006/0145985 A1* | 7/2006 | Hwang et al. | 345/92 |
| 2006/0208991 A1* | 9/2006 | Uekuri et al. | 345/98 |
| 2008/0030445 A1 | 2/2008 | Choi et al. | |

FOREIGN PATENT DOCUMENTS

| | | |
|---|---|---|
| CN | 1437175 | 8/2003 |
| CN | 1530723 | 9/2004 |
| CN | 1641728 | 7/2005 |
| JP | 2005-156764 A | 6/2005 |
| JP | 2005-257931 A | 9/2005 |
| JP | 2006-011405 | 1/2006 |
| JP | 2006-145923 A | 6/2006 |
| JP | 2007-163824 A | 6/2007 |
| KR | 10-2000-0006515 | 1/2000 |
| KR | 1020050096669 A | 10/2005 |

* cited by examiner

*Primary Examiner* — Quan-Zhen Wang
*Assistant Examiner* — Jennifer Nguyen
(74) *Attorney, Agent, or Firm* — Innovation Counsel LLP

(57) ABSTRACT

In one embodiment of the invention, a display device includes a plurality of gate lines transferring gate signals, a plurality of data lines transmitting data voltages, a plurality of storage electrode lines transferring storage signals, and a plurality of pixels arranged in a matrix, each pixel comprising a switching element connected to a gate line and a data line, a liquid crystal capacitor connected to the switching element and a common voltage, and a storage capacitor connected to the switching element and a storage electrode line. The display device may further include a plurality of signal generating circuits generating the storage signals, wherein the signal generating circuit is connected to a k-th storage electrode line, where k is a natural number.

20 Claims, 12 Drawing Sheets

(PRIOR ART)

DISPLAY DEVICE AND DRIVING APPARATUS

CROSS-REFERENCE TO RELATED APPLICATION

This application is a continuation of U.S. patent application Ser. No. 11/648,372, filed Dec. 28, 2006 now U.S. Pat. No. 7,907,107, which claims priority to and the benefit of Korean Patent Application No. 10-2006-0008148 filed in the Korean Intellectual Property Office on Jan. 26, 2006, the entire contents of which are incorporated herein by their references.

BACKGROUND (a) Technical Field

The present invention relates to a liquid crystal display (LCD) device.

(b) Related Art

In general, liquid crystal display (LCD) devices include two display panels having pixel electrodes and a common electrode, and a liquid crystal layer having an anisotropy dielectric disposed between the display panels. The pixel electrodes are arranged in a matrix, and are connected to switching elements such as thin film transistors (TFTs) to sequentially receive data voltages by rows. The common electrode is formed on the entire surface of one of the display panels and may receive a common voltage. A liquid crystal capacitor is formed with the pixel electrode, the common electrode, and the liquid crystal layer therebetween. The liquid crystal capacitor and the switching element connected to the liquid crystal capacitor form a pixel unit.

In LCD devices, a voltage is applied to the two electrodes to form an electric field on the liquid crystal layer. A desired image is obtained by controlling the strength of the electric field and controlling the transmittance of light passing through the liquid crystal layer. When an electric field is applied to the liquid crystal layer in one direction, degradation of the LCD device may occur. In order to prevent such degradation, the polarity of the data voltage with respect to a common voltage may be inverted for each frame, row, or pixel.

Because of the slow response rate of liquid crystal molecules, it takes time to charge a liquid crystal capacitor up to a target voltage (hereinafter, "pixel voltage") to obtain a desired luminance. This time depends on the difference between the target voltage and the voltage previously charged to the liquid crystal capacitor. Thus, when the difference between a target voltage and the previous voltage is great and the target voltage is applied at a beginning stage, it may be impossible to reach the target voltage during the time a switching element is turned on.

Accordingly, a dynamic capacitance compensation (DCC) method has been developed. When the voltage applied between both ends of a liquid crystal capacitor is greater, charging time is reduced. The DCC method raises the data voltage to be applied to each pixel to a voltage greater than a target voltage. This shortens the time required for the pixel voltage to reach the target voltage. The data voltage is practically the difference between a data voltage and a common voltage, but the DCC method sets the common voltage to 0V for the sake of convenience.

The DCC method however, requires a frame memory and a driving circuit for performing DCC computations. As a result, the DCC method requires changes in circuit design and raises manufacturing costs.

Small LCD devices such as those used for mobile phones, perform row inversion that inverts the polarity of the data voltage with respect to the common voltage by rows to reduce power consumption. Because small LCD devices can require high resolutions, power consumption is an important factor in such devices. In particular, power consumption will be increased in the performance of DCC computation because the DCC method requires additional computations or circuits.

Further, the data voltage range used for displaying an image in the case of row inversion is smaller than that for dot inversion in which the polarity of a data voltage with respect to the common voltage is inverted by pixels. Thus, if the threshold voltage for driving liquid crystals is high, such as in a vertical alignment (VA) mode liquid crystal display, the data voltage range for gray representation used for actual image display becomes as low as the threshold voltage. Thus, luminance representation in such configurations is difficult.

The above information disclosed in this Background section is only for enhancement of understanding of the background of the invention and therefore it may contain information that does not form the prior art that is already known in this country to a person of ordinary skill in the art.

SUMMARY

In accordance with various embodiments of the invention, power consumption of liquid crystal display devices may be reduced, response times of liquid crystal layers of such display devices may be improved, and image definition of such display devices may be improved without significantly increasing power consumption.

According to an embodiment of the present invention, a display device configured to display images in a plurality of frames includes a plurality of gate lines adapted to transmit a plurality of gate signals, a plurality of data lines adapted to transmit a plurality of data voltages, a plurality of storage electrode lines adapted to transmit a plurality of storage signals, a plurality of pixels arranged in a matrix having a plurality of rows, wherein each pixel comprises a switching element connected to one of the gate lines and one of the data lines, a liquid crystal capacitor connected to the switching element and a common voltage, and a storage capacitor connected to the switching element and one of the storage electrode lines, and a plurality of signal generating circuits connected to the storage electrode lines, wherein each of the signal generating circuits is adapted to apply a storage signal having a first or second voltage to an associated one of the storage electrode lines in response to a gate signal immediately after the liquid crystal capacitor and storage capacitors of an associated row of pixels have been charged by the data voltages, adapted to invert the voltage of the storage signal in response to a first control signal, and adapted to maintain the storage signal for a first predetermined time period in response to a second control signal and a third control signal.

The storage signals applied to adjacent storage electrode lines may have different voltage levels from each other.

The first control signal may be adapted to invert the storage signal for every frame. wherein the common voltage may be a fixed voltage.

The first control signal and the third control signal may have substantially the same phase.

The second control signal and the third control signal may have substantially inverted phases.

The first, second, and third control signals may have substantially the same period.

The first, second, and third control signals may have a period of about one horizontal period (1 H).

The first, second, and third control signals may have substantially the same duty ratio.

The first, second, and third control signals may have a duty ratio of about 50%.

The display device may further include an additional gate line adapted to transmit one of the gate signals to one of the signal generating circuits.

The additional gate line may be connected to a last one of the signal generating circuits.

Each gate signal may be configured to provide a gate-on voltage and a gate-off voltage, wherein the gate-on voltages of two of the gate signals transmitted by two adjacent gate lines overlap for a second predetermined time period.

The second predetermined time period may correspond to about one horizontal period (1 H).

Each of the signal generating circuits may be associated with a corresponding one of the gate lines, wherein each of the signal generating circuits may further include a first transistor having a control terminal connected to the one of the gate lines, an input terminal adapted to receive the first control signal, and an output terminal connected to the one of the storage electrode lines.

Each of the signal generating circuits may further include a second transistor having a control terminal connected to the one of the gate lines and an input terminal adapted to receive the second control signal, and a third transistor having a control terminal connected to the one of the gate lines and an input terminal adapted to receive the third control signal.

Each of the signal generating circuits may further include a fourth transistor having a control terminal connected to an output terminal of the third transistor, an input terminal connected to a first driving voltage, and an output terminal connected to the one of the storage electrode lines, a fifth transistor having a control terminal connected to an output terminal of the second transistor, an input terminal connected to the one of the storage electrode lines, and an output terminal connected to a second driving voltage, a first capacitor connected between the input terminal and the control terminal of the fourth transistor, and a second capacitor connected between the control terminal and the output terminal of the fifth transistor.

According to another embodiment of the present invention, a display device configured to display images in a plurality of frames includes a plurality of gate lines adapted to transmit a plurality of gate signals, a plurality of data lines adapted to transmit a plurality of data voltages, a plurality of storage electrode lines adapted to transmit a plurality of storage signals, a plurality of pixels arranged in a matrix having a plurality of rows, wherein each pixel comprises a switching element connected to one of the gate lines and one of the data lines, a liquid crystal capacitor connected to the switching element and a common voltage, and a storage capacitor connected to the switching element and one of the storage electrode lines, and a plurality of signal generating circuits connected to the storage electrode lines, wherein each of the signal generating circuits is adapted to apply a storage signal having a first or second voltage to an associated one of the storage electrode lines in response to a first gate signal immediately after the liquid crystal capacitor and storage capacitors of a first row of pixels have been charged by a first set of the data voltages, wherein the first gate signal is received over a first gate line associated with the signal generating circuit, adapted to invert the voltage of the storage signal in response to a first control signal or in response to a second gate signal received over a second gate line associated with the signal generating circuit, and adapted to maintain the storage signal for a first predetermined time period in response to a second control signal and a third control signal.

The storage signals applied to adjacent storage electrode lines may have different voltage levels from each other.

The first control signal may be adapted to invert the storage signal for every frame.

The common voltage may have a fixed voltage.

The first control signal and the third control signal may have substantially the same phase.

The second control signal and the third control signal may have substantially inverted phases.

The first, second, and third control signals may have substantially the same period.

The first, second, and third control signals have a period of about one horizontal period (1 H).

The first, second, and third control signals may have substantially the same duty ratio.

The first, second, and third control signals may have a duty ratio of about 50%.

The display device may further include an additional gate line adapted to transmit one of the gate signals to one of the signal generating circuits.

The additional gate line may be connected to a last one of the signal generating circuits.

Each of the signal generating circuits may further include a first transistor having a control terminal connected to the second gate line, an input terminal adapted to receive the first control signal, and an output terminal connected to the one of the storage electrode lines.

Each of the signal generating circuits may further include a second transistor having a control terminal connected to the second gate line, and an input terminal adapted to receive the second control signal, and a third transistor having a control terminal connected to the second gate line, and an input terminal adapted to receive the third control signal.

Each of the signal generating circuits may further include a fourth transistor having a control terminal connected to an output terminal of the third transistor, an input terminal connected to a first driving voltage, and an output terminal connected to the one of the storage electrode lines, a fifth transistor having a control terminal connected to an output terminal of the second transistor, an input terminal connected to the one of the storage electrode lines, and an output terminal connected to a second driving voltage, a first capacitor connected between the input terminal and the control terminal of the fourth transistor, and a second capacitor connected between the control terminal and the output terminal of the fifth transistor.

Each of the signal generating circuits may further include a sixth transistor having an input terminal adapted to receive the first control signal, a control terminal connected to the first gate line, and an output terminal connected to the one of the storage electrode lines.

According to another embodiment of the present invention, a method of driving a display device is provided, wherein the display device includes a plurality of pixels arranged in a matrix having a plurality of rows, wherein each pixel comprises a switching element connected to one of a plurality of gate lines and one of a plurality of data lines, a liquid crystal capacitor connected to the switching element and a common voltage, and a storage capacitor connected to the switching element and one a plurality of storage electrode lines. The method includes applying a first set of data voltages to the data lines; applying a first gate voltage to a first gate line connected with a first row of pixels; applying a first storage signal having a first voltage to a first storage electrode line connected with the first row of pixels to maintain the first voltage on the storage capacitors of the first row of pixels; maintaining the first storage signal for a first predetermined time period; applying a second set of data voltages to the data lines; applying a second gate voltage to a second gate line connected with a second row of pixels; applying a second storage signal having a second voltage to a second storage electrode line connected with the second row of pixels to maintain the second voltage on the storage capacitors of the second row of pixels; and maintaining the second storage signal for a second predetermined time period.

The first and second voltages may be approximately equal and opposite in polarity to each other.

The first and second gate signals may overlap with each other in time.

BRIEF DESCRIPTION OF THE DRAWINGS

Referring to the accompanying drawings, various embodiments of the invention are illustrated in detail.

DETAILED DESCRIPTION

Figure 1:
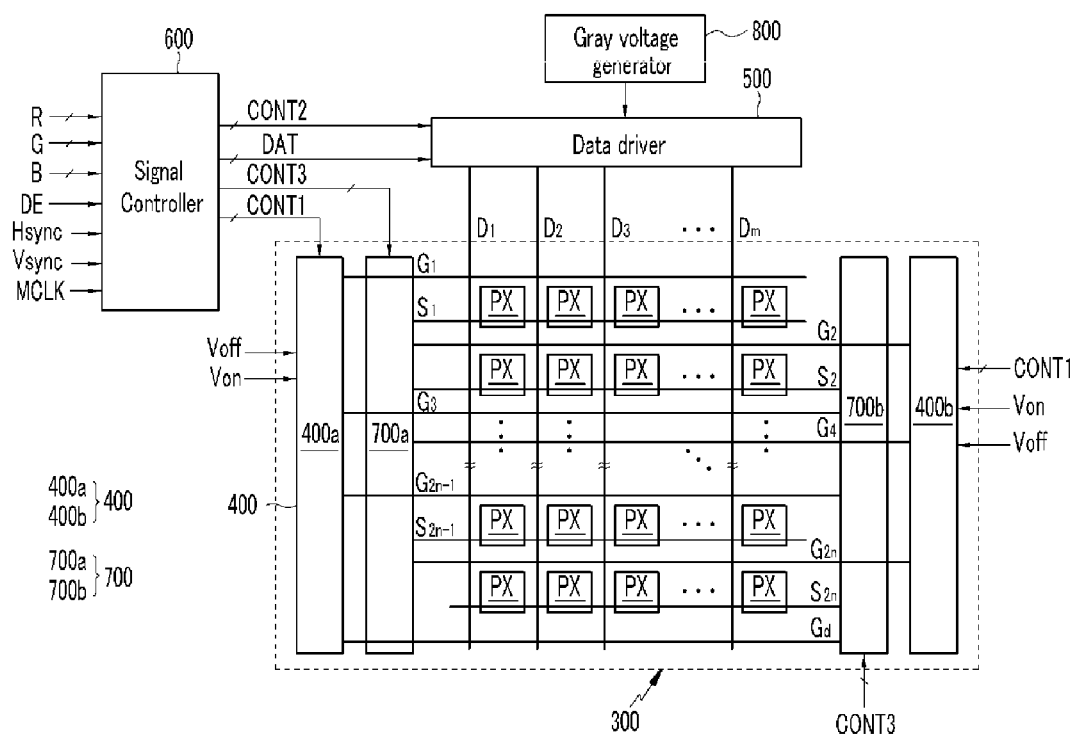
FIG. 1 is a block diagram of a liquid crystal display according to an embodiment of the invention.

The invention will be described more fully hereinafter with reference to the accompanying drawings, in which embodiments of the invention are shown.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

Figure 2:
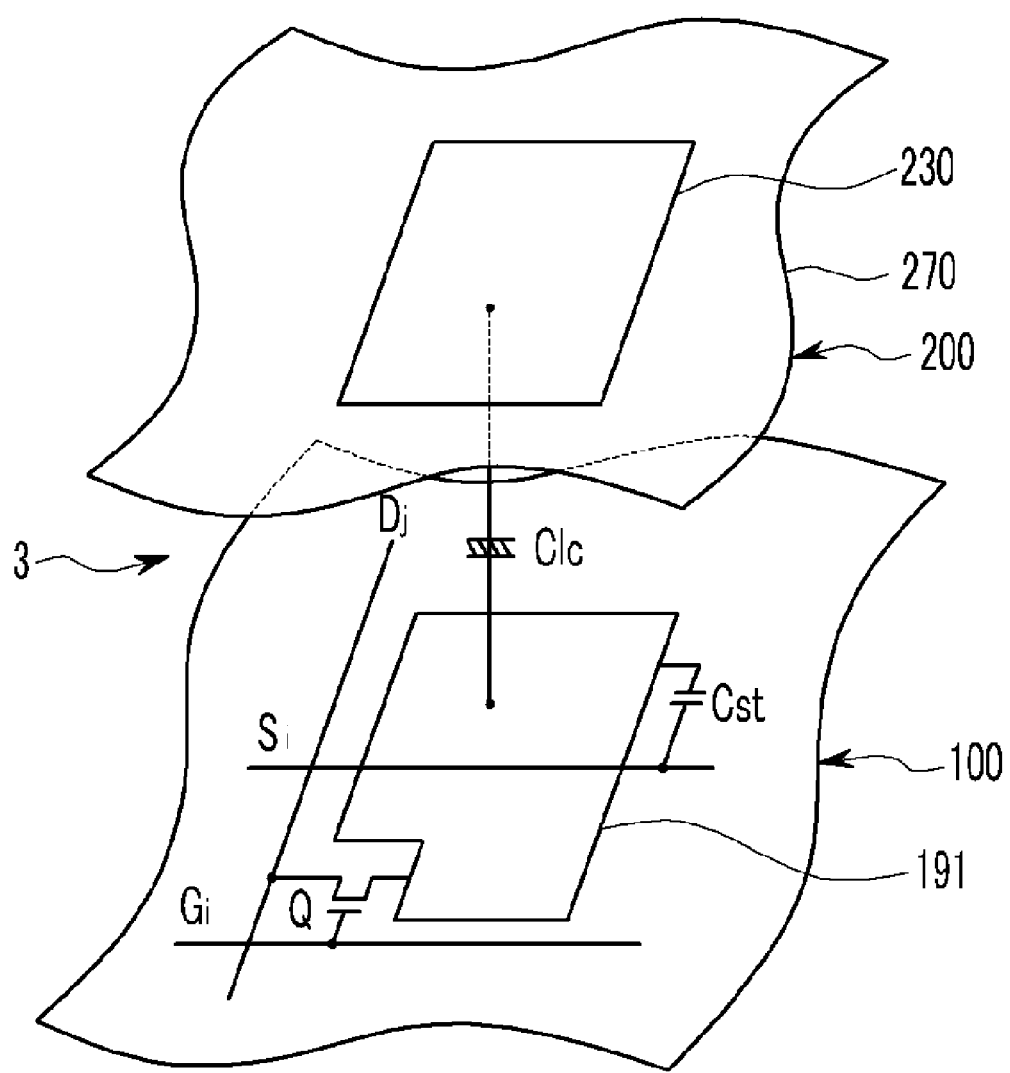
FIG. 2 is an equivalent circuit diagram of a pixel of a liquid crystal display according to an embodiment of the invention.

Referring to FIG. 1 and FIG. 2, a liquid crystal display according to an embodiment of the invention is illustrated in detail. FIG. 1 is a block diagram of a liquid crystal display according to an embodiment of the invention, and FIG. 2 is an equivalent circuit diagram of the pixel of the liquid crystal display according to an embodiment of the invention.

As shown in FIG. 1, a liquid crystal display according to an exemplary embodiment of the invention includes a liquid crystal panel assembly 300, a gate driver 400, a data driver 500, a gray voltage generator 800 connected to the data driver 500, a storage signal generator 700, and a signal controller 600 controlling the above elements.

The liquid crystal panel assembly 300 includes a plurality of signal lines ($G_1$-$G_{2n}$, $G_d$, $D_1$-$D_m$, and $S_1$-$S_{2n}$) and a plurality of pixels PX connected to the signal lines $G_1$-$G_{2n}$, $G_d$, $D_1$-$D_m$, and $S_1$-$S_{2n}$ and arranged substantially in a matrix. As shown in FIG. 2, the liquid crystal panel assembly 300 includes lower and upper panels 100 and 200 facing each other and a liquid crystal layer 3 interposed between the panels 100 and 200.

The signal lines include a plurality of gate lines $G_1$-$G_{2n}$ and $G_d$, a plurality of data lines $D_1$-$D_m$, and a plurality of storage electrode lines $S_1S_{2n}$.

The gate lines $G_1$-$G_{2n}$, and $G_d$ include a plurality of normal gate lines $G_1$-$G_{2n}$, and an additional gate line $G_d$ transmitting gate signals (also referred to as "scanning signals" hereinafter). The storage electrode lines $S_1$-$S_{2n}$, are alternately connected to the normal gate lines $G_1$-$G_{2n}$, and transmit storage signals. The data lines $D_1$-$D_m$ transmit data voltages.

The gate lines $G_1$-$G_{2n}$, $G_d$ and the storage electrode lines $S_1S_{2n}$ extend substantially in a row direction and substantially parallel to each other, while the data lines $D_1$-$D_m$ extend substantially in a column direction and substantially parallel to each other.

Referring to FIG. 2, each pixel PX, for example a pixel PX connected to the i-th normal gate line $G_i$ (i=1, 2, . . . , 2n) and the j-th data line $D_j$ (j=1, 2, . . . , m), includes a switching element Q connected to the signal lines $G_i$ and $D_j$, and a liquid crystal capacitor Clc and a storage capacitor Cst that are connected to the switching element Q. The switching element Q may be implemented, for example, as a three-terminal element such as a thin film transistor installed on the lower panel 100. The three-terminal element has a control terminal connected to the normal gate line $G_i$, an input terminal connected to the data line $D_j$, and an output terminal connected to the liquid crystal capacitor Clc and the storage capacitor Cst.

A pixel electrode 191 of the lower panel 100 and a common electrode 270 of the upper panel 200 are two terminals of the liquid crystal capacitor Clc. The liquid crystal layer 3 disposed between the electrodes 191 and 270 acts as a dielectric material. The pixel electrode 191 is connected to the switching element Q. The common electrode 270 is disposed on the entire upper panel 200 and receives a common voltage Vcom. The common voltage may include, for example, a direct current (DC) voltage having a predetermined value. Alternatively, the common electrode 270 may be formed on the lower panel 100. In this case, at least one of the electrodes 191 and 270 may have a linear or plate shape.

The storage capacitor Cst assists the liquid crystal capacitor Clc and is formed by overlapping a pixel electrode 191 and a storage electrode line $S_i$ with an insulator between them. For a color display, each pixel PX may represent one primary color (spatial division) or may alternatively represent different primary colors depending on time (temporal division). Thus, a desired color is displayed by a spatial and temporal sum of the primary colors. Examples of the primary colors include red, green, and blue. FIG. 2 shows an exemplary spatial division. Each pixel PX has a color filter 230 representing one of the primary colors on the region of the upper panel 200 corresponding to the pixel electrode 191. Alternatively, the color filter 230 may be formed above or below the pixel electrode 191 of the lower panel 100.

At least one polarizer (not shown) to polarize light is attached to the liquid crystal panel assembly 300.

Referring to FIG. 1, the gray voltage generator 800 may generate a full number of gate voltages or a limited number of gray voltages (referred to as "reference gray voltages" hereinafter) related to the transmittance of the pixels PX. Some of the reference gray voltages have a positive polarity relative to the common voltage Vcom, while the other reference gray voltages have a negative polarity relative to the common voltage Vcom.

The gate driver 400 includes first and second gate driving circuits 400a and 400b respectively arranged on both sides of the liquid crystal panel assembly 300 (for example, right and left sides).

The first gate driving circuit 400a is connected to ends of the odd-numbered normal gate lines $G_1, G_3, \ldots,$ and $G_{2n-1}$ and the additional gate line $G_d$. The second gate driving circuit 400b is connected to ends of the even-numbered normal gate lines $G_2, G_4, \ldots,$ and $G_{2n}$. Alternatively, the second gate driving circuit 400b may be connected to ends of the odd-numbered normal gate lines $G_1, G_3, \ldots,$ and $G_{2n-1}$ and the additional gate line $G_d$, and the first gate driving circuit 400a may be connected to ends of the even-numbered normal gate lines $G_2, G_4, \ldots, G_{2n}$.

Each of the first and second gate driving circuits 400a and 400b synthesizes a gate-on voltage Von and a gate-off voltage Voff to generate the gate signals for application to the gate lines $G_1$-$G_{2n}$, and $G_d$.

The gate driver 400 is integrated into the liquid crystal panel assembly 300 along with the signal lines $G_1$-$G_{2n}$, $G_d$, $D_1$-$D_m$, and $S_1$-$S_{2n}$ and the switching elements Q. In one embodiment, the gate driver 400 may include at least one integrated circuit (IC) chip mounted on the LC panel assembly 300 or on a flexible printed circuit (FPC) film in a tape carrier package (TCP), which is attached to the panel assembly 300. Alternatively, the gate driver 400 may be mounted on a separate printed circuit board (not shown).

The storage signal generator 700 includes first and second storage signal generating circuits 700a and 700b arranged on both sides of the liquid crystal panel assembly 300, for example, and adjacent to the first and second gate driving circuits 400a and 400b.

The first storage signal generating circuit 700a is connected to the odd-numbered storage electrode lines $S_1$, $S_3, \ldots,$ and $S_{2n-1}$ and the even-numbered normal gate lines $G_2, G_4, \ldots,$ and $G_{2n}$ and applies storage signals having a high level voltage and a low level voltage.

The second storage signal generating circuit 700b is connected to the even-numbered storage electrode lines $S_2$, $S_4, \ldots,$ and $S_{2n}$ and the odd-numbered normal gate lines $G_3, \ldots,$ and $G_{2n-1}$ (except for the first normal gate line $G_1$ and the additional gate line $G_d$.) and applies the storage signals to the storage electrode lines $S_2, S_4, \ldots,$ and $S_{2n}$.

Instead of the storage signal generator 700 being supplied with the signal from the additional gate line $G_d$ connected to the gate driver 400, the storage signal generator 700 may be supplied with a signal from a separate unit such as the signal controller 600 or a separate signal generator (not shown). In this case, the additional gate line $G_d$ is not necessarily formed on the liquid crystal panel assembly 300.

The storage signal generator 700 is integrated into the liquid crystal panel assembly 300 along with the signal lines $G_1$-$G_{2n}$, $G_d$, $D_1$-$D_m$, and $S_1$-$S_{2n}$ and the switching elements Q. In one embodiment, the storage signal generator 700 may include at least one integrated circuit (IC) chip mounted on the LC panel assembly 300 or on a flexible printed circuit (FPC) film in a tape carrier package (TCP), which is attached to the panel assembly 300. Alternatively, the storage signal generator 700 may be mounted on a separate printed circuit board (not shown).

The data driver 500 is connected to the data lines $D_1$-$D_m$ of the panel assembly 300 and applies data voltages, which are selected from the gray voltages supplied from the gray voltage generator 800, to the data lines $D_1$-$D_m$. However, when the gray voltage generator 800 generates only some rather than all the gray voltages, the data driver 500 may divide the reference gray voltages to generate the data voltages among the gray voltages. In one embodiment, drivers 500, 600, and 800 may include at least one integrated circuit (IC) chip mounted on the LC panel assembly 300 or on a flexible printed circuit (FPC) film in a tape carrier package (TCP), which is attached to the panel assembly 300. Alternately, at least one of the drivers 400, 500, 600, and 800 may be integrated into the panel assembly 300 along with the signal lines $G_1$-$G_{2n}$, $G_d$, $S_1$-$S_{2n}$, and $D_1$-$D_m$ and the switching elements Q. Alternatively, all the drives 400, 500, 600, and 800 may be integrated into a single IC chip, but at least one of the drivers 400, 500, 600, and 800 or at least one circuit element in at least one of drivers 400, 500, 600, and 800 may be disposed outside the single IC chip.

The signal controller 600 controls the gate driver 400, the data driver 500, and the storage signal generator 700.

The operation of the liquid crystal display is described below.

The signal controller 600 receives input image signals R, G, and B and input control signals for controlling the input image signals from an external graphics controller (not shown). The input image signals R, G, and B contain luminance information for pixels PX, and the luminance has a predetermined number of grays, for example, $1024(=2^{10})$, $256(=2^8)$, or $64(=2^6)$ grays.

The input control signals include, for example, a vertical synchronization signal Vsync, a horizontal synchronization signal Hsync, a main clock signal MCLK, and a data enable signal DE.

The signal controller 600 processes the input image signals R, G, and B based on an input control signal and the input image signals R, G and B, according to an operating condition of the liquid crystal panel assembly 300, generates gate control signals CONT1, data control signals CONT2, and storage control signals CONT3, and applies the gate control signals CONT1 to the gate driver 400, the data control signals CONT2 and the image signals DAT to the data driver 500, and the storage control signals CONT3 to the storage signal generator 700.

The gate control signals CONT1 include scanning start signals STV1 and STV2 for indicating the start of the scanning, and at least one clock signal for controlling an output period of a gate-on voltage Von. The gate control signal CONT1 may further include an output enable signal OE for limiting a time period of the gate-on voltage Von.

The data control signals CONT2 include a horizontal synchronization start signal STH for indicating the start of data transmission for a row of pixels PX, a load signal LOAD to apply the data voltages to data lines $D_1$-$D_m$, and a data clock signal HCLK. The data control signals CONT2 may further include an inversion signal RVS for reversing the polarity of the data voltages (relative to the common voltage Vcom).

Responsive to the data control signals CONT2 from the signal controller 600, the data driver 500 receives a packet of the digital image signals DAT for the row of pixels PX from the signal controller 600, converts the digital image signals DAT into analog data voltages selected from the gray voltages, and applies the analog data voltages to the data lines $D_1$-$D_m$.

The gate driver 400 applies the gate-on voltage Von to a corresponding one of the normal gate lines $G_1$-$G_{2n}$, for example an i-th normal gate line $G_i$, in response to the gate control signals CONT1 from the signal controller, 600 and turns on the switching elements Q that are connected to the normal gate line $G_i$ (except the additional gate line $G_d$ that is not connected to the switching elements Q). The data voltages applied to the data lines $D_1$-$D_m$ are then supplied to the pixels PX of the i-th row through the activated switching transistors Q such that the liquid crystal capacitor Clc and the storage capacitor Cst in the pixels PX are charged.

The difference between the data voltage and the common voltage Vcom applied to a pixel PX is represented as a voltage across the liquid crystal capacitor Clc of the pixel PX, which is referred to as a pixel voltage. The liquid crystal molecules in the liquid crystal capacitor Clc have orientations depending on the magnitude of the pixel voltage, and the molecular orientations determine the polarization of light passing through the liquid crystal layer 3. The polarizer(s) converts light polarization to light transmittance such that the pixel PX has a luminance represented by a gray of the data voltage.

With the elapse of a horizontal period (also referred to as "1 H" and is equal to one period of the horizontal synchronization signal Hsync and the data enable signal DE), the data driver 500 applies data voltages to pixels PX of an (i+1)-th row, and then the gate driver 400 changes the gate signal applied to the i-th normal gate line $G_i$ to a gate-off voltage Voff and changes the gate signal applied to the next normal gate line $G_{i+1}$ to a gate-on voltage Von. Then, the switching elements Q of the i-th row are turned off such that pixel electrodes 191 are in a floating state.

The storage signal generator 700 changes a voltage level of a storage signal applied to i-th storage electrode line $S_i$ based on the storage control signals CONT3 and the voltage variation of the gate signal applied to the (i+1)-th gate line $G_{i+1}$. Thereby, a voltage of the pixel electrode 191 connected to one terminal of the storage capacitor Cst is varied in accordance with the voltage variation of the storage electrode line Si connected to another terminal of the storage capacitor Cst. By repeating this procedure for all pixel rows, the liquid crystal display displays an image for a frame.

When the next frame starts after one frame finishes, the inversion signal RVS applied to the data driver 500 is controlled such that the polarity of the data voltages is reversed (which is referred to as "frame inversion"). In addition, the polarity of the data voltages applied to pixels PX of one row is substantially the same, and the polarity of the data voltages applied to pixels PX of the two adjacent rows is reversed (for example, row inversion).

In an embodiment of the invention that performs frame inversion and row inversion, the polarity of all data voltages applied to pixels PX of one row is positive or negative and is changed by a unit of one frame. At this time, a storage signal applied to a storage electrode line $S_1$-$S_{2n}$ is changed from a low level voltage to a high level voltage when the pixel electrode 191 is charged by a data voltage of the positive polarity. On the other hand, the storage signal is changed from a high level voltage to a low level voltage when the pixel electrode 191 is charged by a data voltage of the negative polarity. As a result, the voltage of the pixel electrode 191 increases if the pixel electrode 191 is charged by a positive data voltage of the positive polarity and decreases if the pixel electrode 191 is charged by a negative data voltage. As a result, the voltage range of the pixel electrode 191 is wider than the range of the gray voltages that are the basis of data voltages such that the luminance range using a low basic voltage may be increased.

The first and second storage signal generating circuits 700a and 700b may include a plurality of signal generating circuits 710 connected to the storage electrode lines $S_1$-$S_{2n}$ respectively. An example of the signal generating circuits 710 is described with reference to FIGS. 3 and 4.

Figure 3:
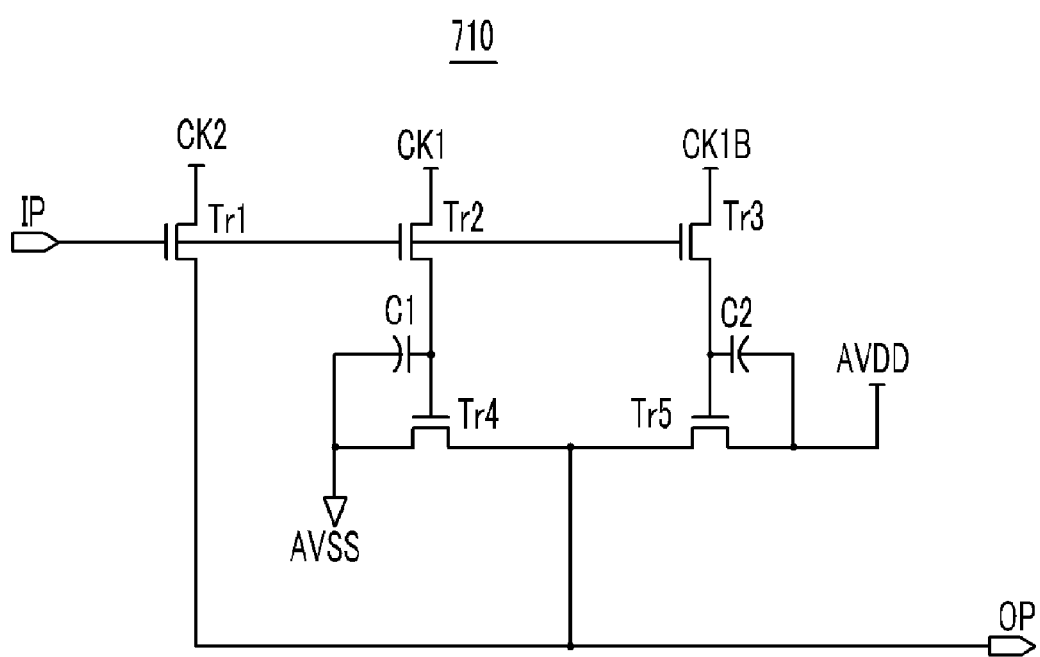
FIG. 3 is a circuit diagram of a signal generating circuit according to an embodiment of the invention.
Figure 4:
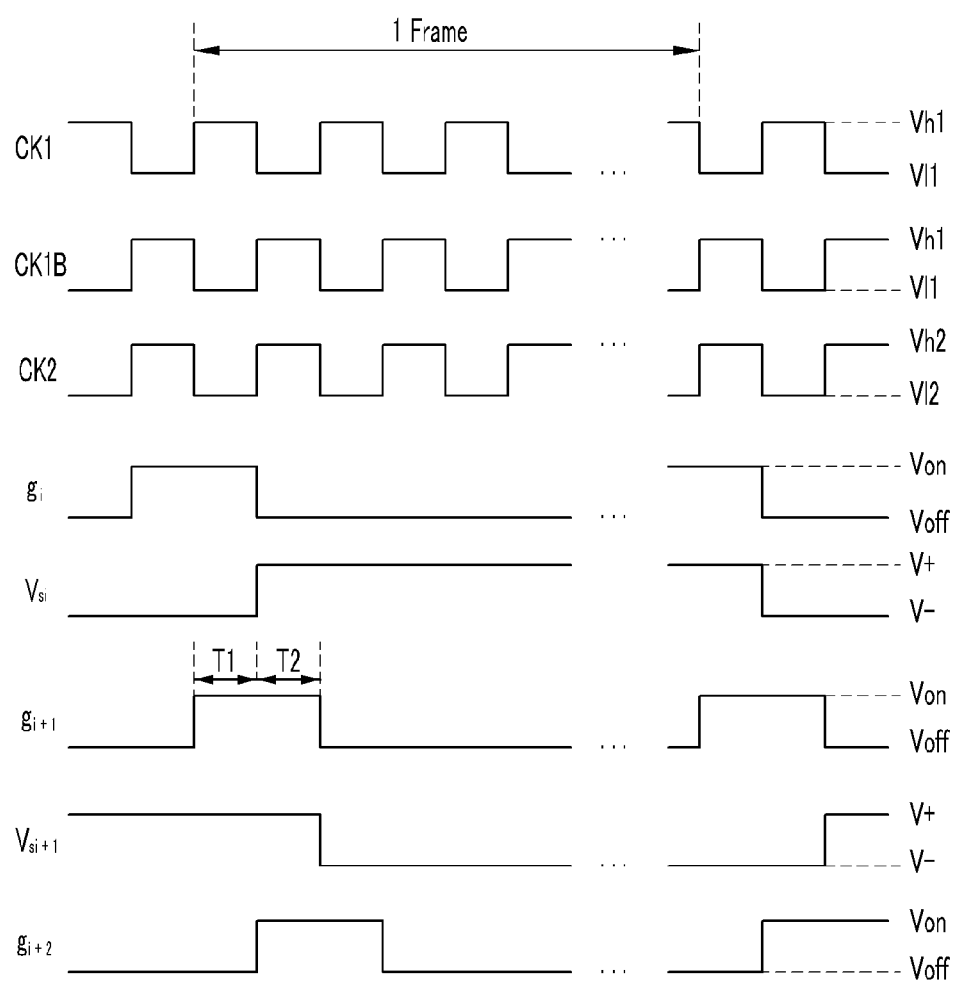
FIG. 4 is a timing diagram of signals used in the liquid crystal display including the signal generating circuit shown in FIG. 3 according to an embodiment of the invention.

FIG. 3 is a circuit diagram of a signal generating circuit according to an embodiment of the invention, and FIG. 4 shows a timing diagram of signals used in a liquid crystal display including the signal generating circuit shown in FIG. 3.

Referring to FIG. 3, a signal generating circuit 710 includes an input terminal IP and an output terminal OP. In an i-th signal generating circuit, the input terminal IP is connected to an (i+1)-th gate line $G_{i+1}$ to be supplied with an (i+1)-th gate signal $g_{i+1}$ (hereinafter referred to as "an input signal"), and the output terminal OP is connected to an i-th storage electrode line $S_i$ to output an i-th storage signal $Vs_i$. Similarly, in an (i+1)-th signal generating circuit, the input terminal IP is connected to an (i+2)-th gate line $G_{i+2}$ to be supplied with an (i+2)-th gate signal $g_{i+2}$ as an input signal, and the output terminal OP is connected to an (i+1)-th storage electrode line $S_{i+1}$ to output an (i+1)-th storage signal $Vs_{i+1}$.

The signal generating circuit 710 is supplied with first, second, and third clock signals CK1, CK1B, and CK2 of the storage control signals CONT3 from the signal controller 600, and is also supplied with a high voltage AVDD and a low voltage AVSS from the signal controller 600 or an external device.

As shown in FIG. 4, the period of the first, second, and third clock signals CK1, CK1B, and CK2 may be about 2H, and a duty ratio thereof may be about 50%. The first and second clock signals CK1 and CK1B have a phase difference of about 180° and are inverted relative to each other. The second clock signal CK1B and the third clock signal CK2 have substantially the same phase. In addition, the first, second, and third clock signals CK1, CK1B, and CK2 are reversed by a unit of a frame.

The first and second clock signals CK1 and CK1B may have a high level voltage Vh1 of about 15V and a low level voltage Vl1 of about 0V. The third clock signal CK2 may have a high level voltage Vh2 of about 5V and a low level voltage Vl2 of about 0V. The high voltage AVDD may be about 5V and about equal to the high level voltage Vh2 of the third clock signal CK2. The low voltage AVSS may be about 0V and about equal to the low level voltage Vl2 of the third clock signal CK2.

The signal generating circuit 710 includes five transistors Tr1-Tr5, each having a control terminal, an input terminal, and an output terminal, and two capacitors C1 and C2. The control terminal of the transistor Tr1 is connected to the input terminal IP, the input terminal of the transistor Tr1 is connected to the third clock signal CK2, and the output terminal of the transistor Tr1 is connected to the output terminal OP. The control terminals of the transistors Tr2 and Tr3 are connected to the input terminal IP, and the input terminals of the transistors Tr2 and Tr3 are connected to the first and second clock signals CK1 and CK1B, respectively.

The control terminals of the transistors Tr4 and Tr5 are connected to the output terminals of the transistors Tr2 and Tr3, respectively, and the input terminals of the transistors Tr4 and Tr5 are connected to the low and high voltages AVSS and AVDD, respectively. The capacitors C1 and C2 are connected between the control terminals of the transistors Tr4 and Tr5 and the low and high voltages AVSS and AVDD, respectively. In one embodiment, the transistors Tr1-Tr5 may be formed from an amorphous silicon or polycrystalline silicon thin film transistor.

The operation of the signal generating circuit will be further described below. Referring to FIG. 4, gate-on voltages Von applied to two adjacent gate lines are overlapped for a predetermined time period, such as about 1 H. As a result, all the pixels PX of a row are charged with data voltages that are applied to pixels of an immediately previous row for about 1 H, and then are charged with data voltages for the remaining 1 H to normally display images.

First, an i-th signal generating circuit will be described. When an input signal, that is, a gate signal applied to an (i+1)-th gate line $G_{i+1}$ is changed into a gate-on voltage Von, the first, second, and third transistors Tr1-Tr3 are turned on. The turned on first transistor Tr1 transmits the third clock signal CK2 to the output terminal OP. As a result, the i-th storage signal $Vs_i$ will exhibit a low level voltage Vl2 of the third clock signal CK2. Meanwhile, the turned on transistor Tr2 transmits a first clock signal CK1 to the control terminal of the transistor Tr4, and the turned on transistor Tr3 transmits the second clock signal CK1B to the control terminal of the transistor Tr5.

Since the first and second clock signals CK1 and CK1B exhibit an inverse relationship, the transistors Tr4 and Tr5 are operated in reverse. That is, when the transistor Tr4 is turned on, the transistor Tr5 is turned off, and, when the transistor Tr4 is turned off, the transistor Tr5 is turned on. When transistor Tr4 is turned on and the transistor Tr5 is turned off, a low voltage AVSS is transmitted to the output terminal OP, and when transistor Tr4 is turned off and the transistor Tr5 is turned on, a high voltage AVDD is transmitted to the output terminal OP.

Gate signal $g_{i+1}$ exhibits the gate on voltage Von, for example, for about 2H. In FIG. 4, the first half of about 1 H is denoted by the first period T1 and the second half of about 1 H is denoted by the latter period T2.

Since for the first period T1, the first clock signal CK1 maintains a high voltage Vh1 and the second and third clock signals CK1B and CK2 maintain low voltages Vl1 and Vl2, respectively, the output terminal OP to which the low voltage Vl2 of third clock signal CK2 transmitted by the transistor Tr1 is supplied with the low voltage AVSS. As a result, the storage signal $Vs_i$ maintains the low level voltage V− having a magnitude equal to that of the low voltage Vl2 and the low voltage AVSS. Also during the first period T1, a voltage between the high level voltage Vh1 of the first clock signal CK1 and the low voltage AVSS is charged into the capacitor C1, and a voltage between the low level voltage Vl1 of the second clock signal CK1B and the high voltage AVDD is charged into the capacitor C2.

Since for the latter period T2, the first clock signal CK1 maintains the low level voltage Vl1, and the second and third clock signals CK1B and CK2 maintain the high level voltages Vh1 and Vh2, respectively, the transistor Tr5 is turned on and the transistor Tr4 is turned off. As a result, the output terminal OP is supplied with the high level voltage Vh2 of the third clock signal CK2 transmitted through the turned on transistor Tr1 such that a state of storage signal $Vs_i$ is changed from the low level voltage V− into a high level voltage V+ having a magnitude equal to that of the high level voltage Vh2. In addition, the output terminal Op is supplied with the high voltage VADD applied through the turned on transistor Tr5, which has a magnitude equal to that of the high level voltage V+.

Meanwhile, since the charged voltage into the capacitor C1 is substantially the same as the difference between the low level voltage Vl1 of the first clock signal CK1 and the low voltage VASS, the capacitor C1 is not charged when the low level voltage Vl1 of the first clock signal CK1 and the low voltage VASS are the same as each other. Since the charged voltage into the capacitor C2 is substantially the same as the difference between the high level voltage Vh1 of the second clock signal CK1B and the high voltage VADD, the charged voltage into the capacitor C2 is not 0V when the high level voltage Vh1 and the high voltage AVDD are different from each other. As described above, when the high level voltage Vh1 of the second clock signal CK1B is about 15V and the high voltage AVDD is about 5V, a voltage of about 10V is charged into the capacitor C2.

When the stage of the gate signal $g_{i+1}$ is changed from the gate-on voltage Von into the gate-off voltage Voff after period T2 elapses, the transistors Tr1-Tr3 are turned off. As a result, the electric connection between the transistor Tr1 and the output terminal OP will be isolated. The control terminals of the transistors Tr4 and Tr5 will also be isolated.

Since the capacitor C1 is not charged, the transistor Tr4 remains in a turned off state. However, the voltage between the high level Vh1 of the second clock signal CK1B and the high voltage AVDD has been charged into the capacitor C2. At this time, when the charged voltage is larger than a threshold voltage of the transistor Tr5, the transistor Tr5 remains in a turned on state. As a result, the high voltage AVDD is provided to the output terminal OP as storage signal $Vs_i$. Accordingly, the storage signal $Vs_i$ maintains the high level voltage V+.

Next, the operation of the (i+1)-th signal generating circuit will be described.

When an (i+2)-th gate signal $g_{i+2}$ having a gate-on voltage Von is applied to the (i+1)-th signal generating circuit (not shown), the (i+1)-th signal generating circuit is operated.

As shown in FIG. 4, when (i+2)-th gate signal $g_{i+2}$ switches to the gate-on voltage Von, the states of the first, second, and third clock signals CK1, CK1B, and CK2 are reversed such that the (i+1)-th gate signal gi+1 has a gate-on voltage Von.

That is, the operation for the first gate-on voltage period T1 of the (i+2)—the gate signal $g_{i+2}$ is the same as that of the latter gate-on period T2 of the (i+1)—the gate signal $g_{i+1}$ such that the transistors Tr1, Tr3, and Tr5 are turned on. Accordingly, the high level voltage Vh2 of the third clock signal CK2 and the high voltage AVDD are applied to the output terminal OP. As a result, the storage signal $Vs_{i+1}$ will be at high level voltage V+.

However, the operation for the latter gate-on voltage period T2 of the (i+2)—the gate signal $g_{i+2}$ is the same as that of the first gate-on period T1 of the (i+1)—the gate signal $g_{i+1}$ such that the transistors Tr1, Tr2, and Tr4 are turned on. Accordingly, the low level voltage Vl2 of the third clock signal CK2 and the low voltage AVSS are applied to the output terminal OP, and the storage signal $Vs_{i+1}$ is changed from the high level voltage V+ into the low voltage V−.

As described above, the transistor Tr1 may apply the third clock signal CK2 as a storage signal while an input signal maintains the gate-on voltage Von, and the remaining transistors Tr2-Tr5 may maintain a state of the storage signal until the next frame using the capacitors C1 and C2 when the output terminal OP is isolated from the output terminal of the transistor Tr1 by the gate-off voltage Voff of the input signal. That is, the transistor Tr1 may apply a storage signal to a corresponding storage electrode line, and the remaining transistors Tr2-Tr5 may uniformly maintain the storage signal. In one embodiment, the size of the transistor Tr1 is much larger than that of the transistors Tr2-Tr5.

The pixel electrode voltage Vp may increase or decrease in response to the voltage variation of the storage signal Vs.

Next, the change of the pixel electrode voltage Vp according to the voltage variation of the storage signal Vs will be described. Hereinafter, each of the capacitors and the capacitance thereof are denoted using the same reference characters.

The pixel electrode voltage Vp may be determined as set forth in the following Equation 1:

$$V_p = V_D \pm \Delta = V_D \pm \frac{C_{st}}{C_{st}+C_k}(V+ - V-) \quad \text{(Equation 1)}$$

In Equation 1, Clc and Cst represent the capacitance of liquid crystal capacitor and storage capacitor, respectively. V+ represents a high level voltage of a storage signal Vs, and V− represents a low level voltage of a storage signal Vs.

As shown in Equation 1, the pixel electrode voltage Vp is defined by adding or subtracting a variation amount Δ, which is defined by the capacitances Clc and Cst of the liquid crystal capacitor and the storage capacitor, respectively, and the voltage variation of the storage signal Vs, from the data voltage $V_D$.

In one embodiment, the data voltage $V_D$ has a range of about 0V to about 5V. The pixel may be implemented such that the values of Cst and Clc are approximately equal. When V+−V−=about 5V, Equation 1 becomes Vp=$V_D$±2.5.

Thus, when the voltage of the storage signal Vs is changed, the pixel electrode voltage Vp changes about ±2.5V with respect to the data voltage $V_D$ applied through corresponding data lines $D_1$-$D_m$, according to the polarity of the data voltage $V_D$. When the polarity of the data voltage $V_D$ is positive (+), the pixel electrode voltage Vp is increased by about +2.5V. When the polarity of the data voltage $V_D$ is negative (−), the pixel electrode voltage Vp is decreased by about −2.5V. According to the change of the pixel electrode voltage Vp, the range of the pixel voltage is also increased. For example, when a common voltage Vcom is fixed to about 2.5V, the range of the pixel voltage is about −2.5V to about +2.5V in response to the data voltage $V_D$ of about 0 to about 5V applied to a pixel. When a storage signal Vs is changed to a high level voltage V+ or a low level voltage V−, the range of the pixel voltage is broadened to about −5V to about +5V.

Thus, the range of the pixel voltage is broadened by the change (Δ) of the pixel electrode voltage Vp that is increased by the voltage variation V+−V− of the storage signal Vs. Thus, the voltage range for gray representation is broadened and luminance is improved.

Further, a common voltage is fixed to a predetermined voltage, and thus power consumption is reduced in comparison with the case in which the common voltage having a low voltage or a high voltage is alternatively applied. When the common voltage applied to a common electrode that is generated between a data line and the common electrode is about 0 or 5V in the parasitic capacitor, the voltage applied to the parasitic capacitor is about ±5V at maximum. When the common voltage is fixed to about 2.5V, the voltage applied to the parasitic capacitor that is generated between the data line and the common electrode is about ±2.5V at maximum. Thus, the power consumption at the parasitic capacitor that is generated between the data line and the common electrode is decreased, and thus total power consumption of a liquid crystal display is decreased.

Since the response speed of a liquid crystal is slow, liquid crystal molecules do not quickly react according to a pixel voltage. The capacitance of a liquid crystal capacitor Clc responds to the pixel voltages applied to both ends of a liquid crystal capacitor Clc, and is changed depending on whether the rearrangement of the liquid crystal molecules is completed and the liquid crystal molecules arrive at a stable state. Thus, the pixel electrode voltage Vp is changed according to whether the liquid crystal molecules are in a stable state.

Next, the change of a pixel electrode voltage Vp according to whether or not liquid crystal molecules are in a stable state is illustrated.

A maximum pixel voltage (e.g., a maximum gray, that is, a white gray in a normal black) applied to a liquid crystal capacitor Clc may be three times greater than a minimum pixel voltage (e.g., a minimum gray, that is, a black gray in a normal black) applied to the liquid crystal capacitor Clc. If V+−V−=5V and Clc=Cst, then when the pixel voltage of the maximum gray is applied to the liquid crystal capacitor Clc and then the liquid crystal molecules arrive at a stable state, the pixel electrode voltage Vp is as represented in Equation 1. Since, as described above, V+−V−=5V and Clc=Cst, the pixel electrode voltage Vp is $V_D$±2.5.

When the pixel voltage of the maximum gray is applied to the liquid crystal capacitor Clc but the liquid crystal molecules do not arrive at a stable state, the pixel electrode voltage Vp may be as represented in the following Equation 2:

$$\begin{aligned}V_p &= V_D \pm \Delta \\ &= V_D \pm \Delta \frac{C_{st}}{C_{st}+C_k}(V+ - V-) \\ &= V_D \pm \frac{C_{st}}{C_{st}+\frac{1}{3}C_{st}}(V+ - V-) \\ &= V_D \pm \frac{3}{4}(V+ - V-)\end{aligned} \quad \text{(Equation 2)}$$

where V+−V−$_L$=5V, and $V_D$=$V_D$±3.75.

Thus, when the pixel voltage of the maximum gray is applied to the liquid crystal capacitor Clc but the liquid crystal molecules do not arrive at a stable state, the pixel electrode voltage Vp maintains the pixel electrode voltage of the case in which the pixel voltage of the minimum gray is applied to the liquid crystal capacitor Clc and the liquid crystal molecules arrive at a stable state. That is, the state of a previous frame is maintained. Thus, the change Δ of the pixel electrode voltage Vp in response to the voltage variation V+−V− of a storage signal is increased from ±2.5V to ±3.75V.

As a result, when the pixel electrode voltage of the minimum gray is changed to the pixel electrode voltage of another gray, the change (Δ) of the pixel electrode voltage Vp in response to the voltage variation V+−V− of the storage signal is further increased according to Equation 2, until the liquid crystal molecules arrive at a stable state. For example, the change is increased to ±3.75V at maximum in the case that V+−V−=5V.

Figure 5:
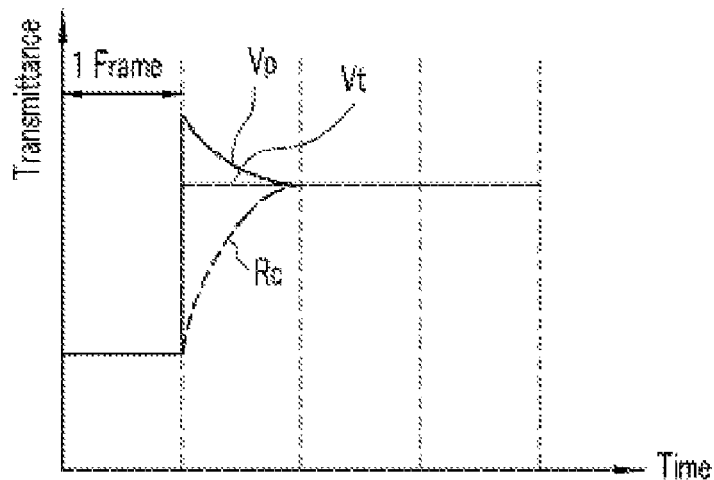
FIG. 5 is a graph illustrating a response speed of liquid crystal in relation to a pixel electrode voltage according to an operation of a signal generating circuit according to an embodiment of the invention.
Figure 6:
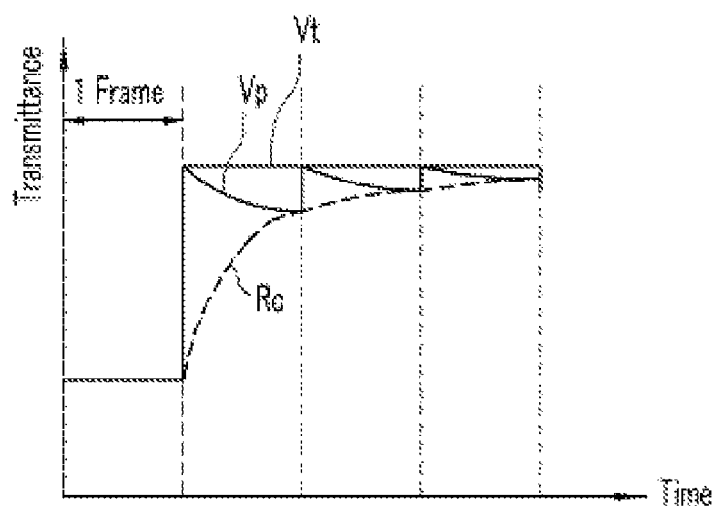
FIG. 6 is a graph illustrating a response speed of liquid crystal in relation to a pixel electrode voltage according to a conventional art.

In a prior art approach shown in FIG. 6, even if a pixel electrode voltage Vp corresponding to a target pixel electrode voltage $V_T$ is applied to a corresponding pixel electrode for each frame, the pixel electrode voltage charged at the pixel electrode is decreased due to an adjacent data voltage after a charging operation is completed. As a result, the pixel electrode voltage cannot arrive at the target pixel electrode voltage $V_T$ within one frame but arrives at the target pixel electrode voltage $V_T$ through several frames. However, in the embodiment shown in FIG. 5, the pixel electrode voltage Vp applied to a corresponding pixel electrode is much greater than the target pixel electrode voltage $V_T$. So within one frame, a corresponding pixel electrode arrives at the target pixel electrode voltage $V_T$ and the response speed RC of the liquid crystal is improved in comparison with that of the prior art.

Accordingly, by adding the voltage variation of the storage signal Vs to or subtracting it from a data voltage $V_D$, the pixel electrode voltage Vp increases by the voltage variation when a pixel has been charged with a data voltage of a positive polarity, and, on the contrary, the pixel electrode voltage Vp decreases by the voltage variation when a pixel has been charged with a data voltage of a negative polarity. As a result, the variation of a pixel voltage becomes wider than the range of a gray voltage by the increased or decreased pixel electrode voltage Vp such that the range of the represented luminance also increases.

Further, since a common voltage is fixed at a predetermined value, the power consumption is reduced as compared with implementations in which the common voltage alternates between high and low values.

Figure 7:
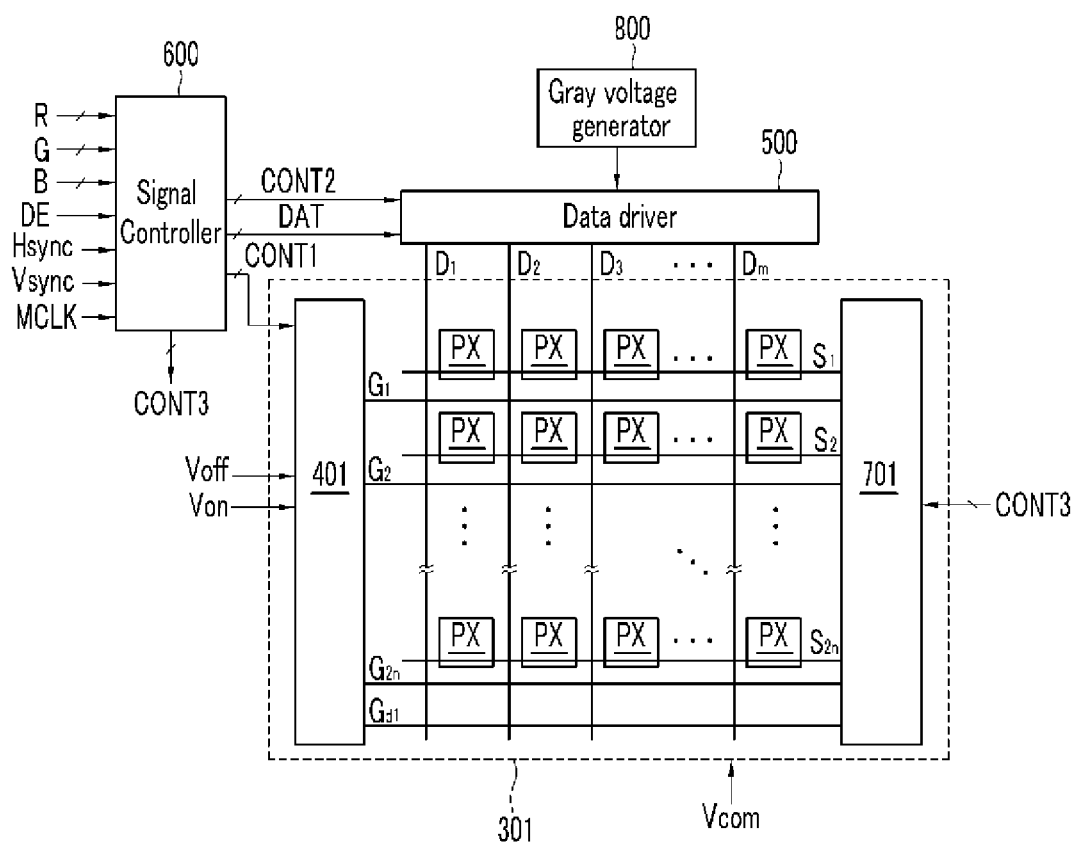
FIG. 7 is a block diagram of a liquid crystal display according to another embodiment of the invention.
Figure 8:
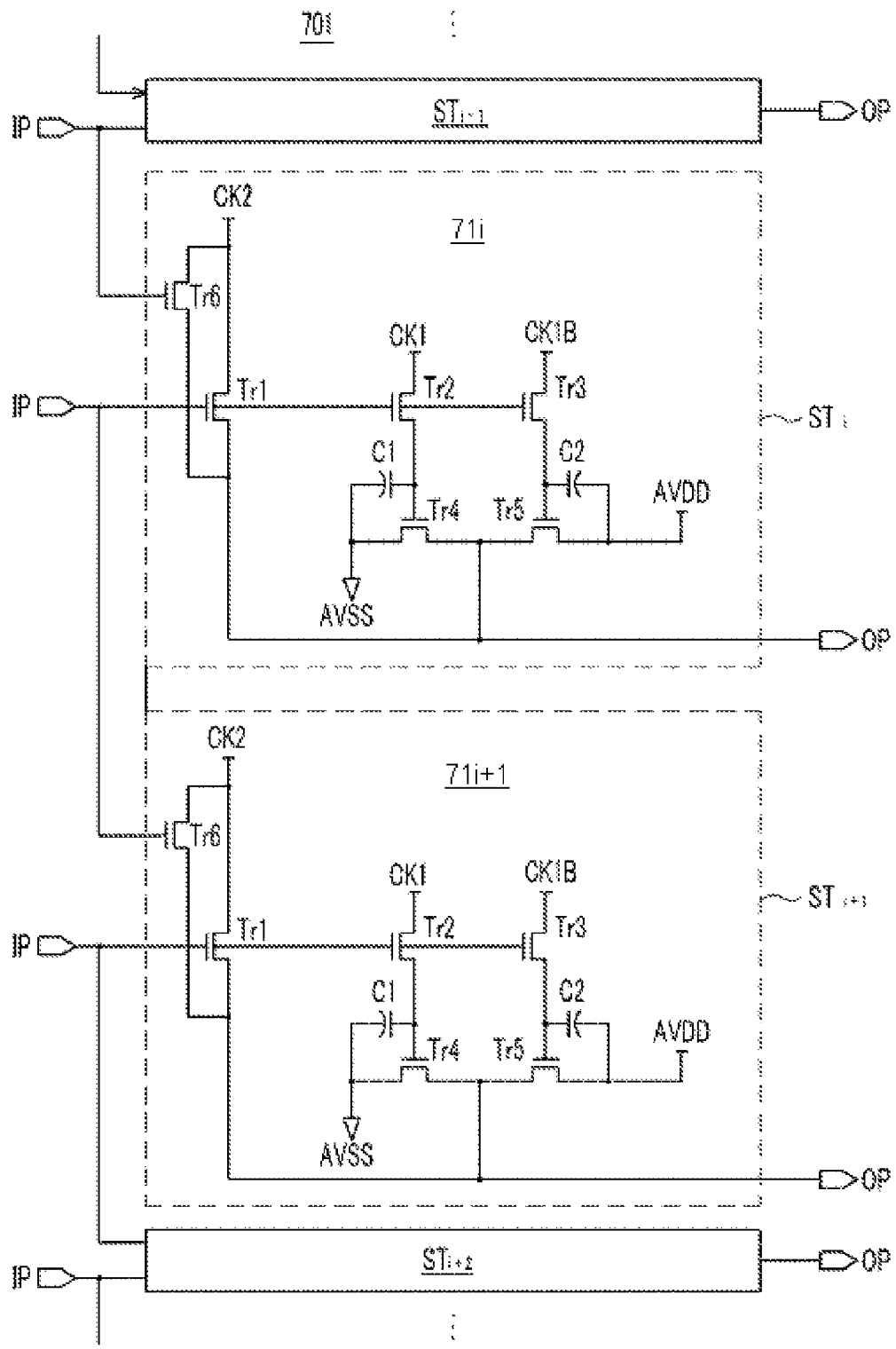
FIG. 8 is a circuit diagram of a signal generating circuit according to another embodiment of the invention.
Figure 9:
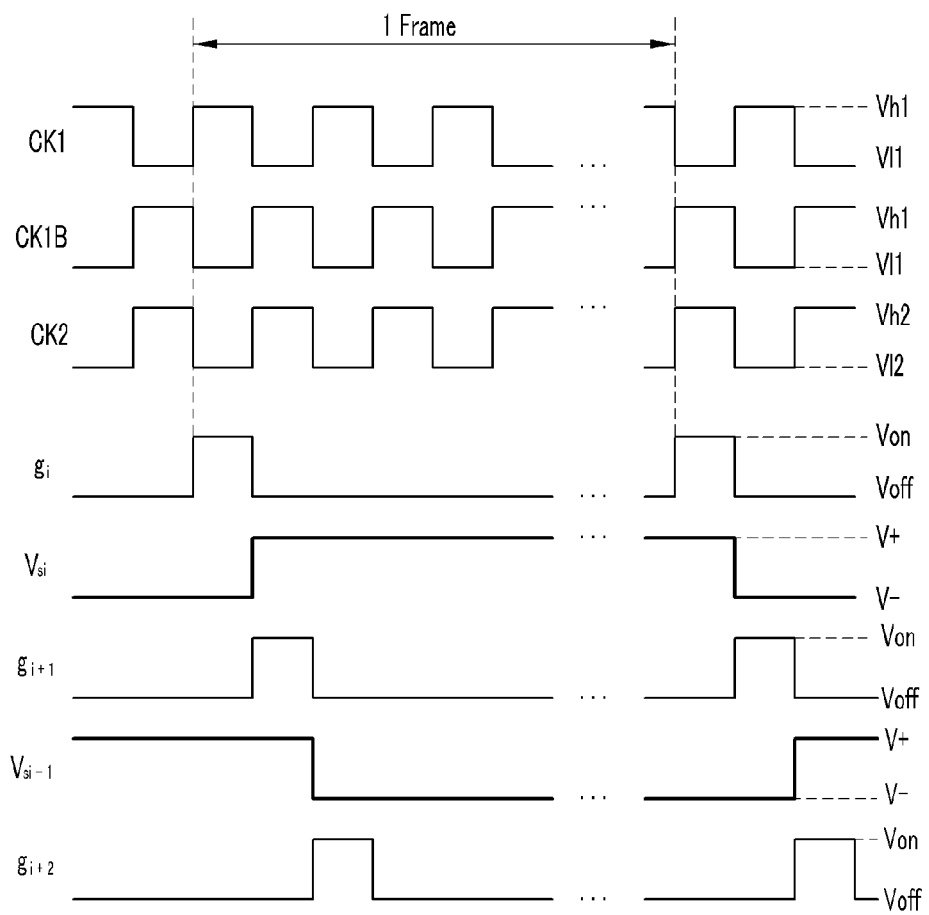
FIG. 9 is a timing diagram of signals used in the liquid crystal display including the signal generating circuit shown in FIG. 8 according to an embodiment of the invention.

Next, referring to FIG. 7 to FIG. 9, a liquid crystal display according to another exemplary embodiment of the present invention is illustrated FIG. 7 is a block diagram of a liquid crystal display according to another embodiment of the invention. FIG. 8 is a circuit diagram of a signal generating circuit according to another embodiment of the invention. FIG. 9 is a timing diagram of signals used in a liquid crystal display including the signal generating circuit shown in FIG. 8.

The liquid crystal display illustrated in FIG. 7 has the same structure as the liquid crystal display illustrated in FIG. 1, except that FIG. 7 provides a single gate driver 401 connected to all normal gate lines $G_1$-$G_{2n}$, and an additional gate line Gd1, and a single storage signal generator 701 connected to all storage electrode lines $S_1$-$S_{2n}$. Identical reference numerals are used in FIGS. 1 and 7 for corresponding structures.

In one embodiment, the gate driver 401 and the storage signal generator 701 are formed with the same manufacturing process along with and switching elements Q of pixels PX and are integrated into a liquid crystal panel assembly 301. In another embodiment, each may be directly installed on the liquid crystal panel assembly 301 as an IC chip. In another embodiment, they may be installed on a flexible printed circuit film (not shown), and installed as a tape carrier package (TCP) on the liquid crystal panel assembly 301 or an additional printed circuit board (PCB). The gate driver 401 sequentially applies a gate-on voltage Von from a first normal gate line $G_1$ to the additional gate line Gd1, controls the charging of a corresponding pixel row connected to each of normal gate lines $G_1$-$G_{2n}$, and controls the operation of the storage signal generator 701.

The storage signal generator 701 includes a plurality of signal generating circuits connected to storage electrode lines $S_1$-$S_{2n}$. Each of the signal generating circuits has the same structure except for input signals, and performs the same operation except for input signals. Thus, referring to FIG. 8, the structure and operation of the i-th and (i+1)-th signal generating circuits $71_i$ and $71_{i+1}$ applying storage signals $Vs_i$ and $Vs_{i+1}$ to i-th and (i+1)-th storage electrode lines $S_i$ and $S_{i+1}$ respectively, are illustrated.

As shown in FIG. 8, each of the signal generating circuits $71_i$ and $71_{i+1}$ are the same as the signal generating circuit illustrated in FIG. 3, except that they further include a transistor Tr6. Therefore, the description of the transistors Tr1-Tr5 in signal generating circuits $71_i$ and $71_{i+1}$ are omitted below.

The transistor Tr6 includes an input terminal connected to a third clock signal CK2, a control terminal connected to an input terminal IP of an immediately previous signal generating circuit, and an output terminal connected to an output terminal OP. The transistor Tr6, like the transistors Tr1-Tr5, may include an amorphous silicon or polycrystalline silicon thin film transistor.

The signal generating circuit connected to the storage electrode line formed at one pixel row receives a gate signal applied to a corresponding pixel row, as well as a gate signal applied to a previous pixel row. Thus, the signal generating circuit connected to a last storage electrode line $S_{2n}$ is connected to the additional gate line Gd1 and receives a gate signal. Alternatively, the signal generating circuit connected to the last storage electrode line $S_{2n}$ may receive a control signal from another device such as a signal controller 600 rather than a gate driver 400, or from the outside.

Referring to FIG. 9, an operation of the signal generating circuits $71_i$ and $71_{i+1}$ is illustrated. As described above, a liquid crystal display may perform one-row inversion and frame inversion. As shown in FIG. 9, the first, second, and third clock signals CK1, CK1B, and CK2 are the same as those shown in FIG. 4. As shown in FIG. 9, the gate-on voltage Von sequentially applied to each of gate lines $G_1$-$G_{2n}$ and Gd1 does not overlap with adjacent gate-on voltage Von. and is sequentially applied from a first gate line $G_1$ to the additional gate line Gd1. When the state of the gate signal $g_i$ to be applied to an i-th gate line $G_i$ is the gate-on voltage Von, the transistor Tr6 of an i-th signal generating circuit $71_i$ is turned on and a low level voltage Vl2 of the third clock signal CK2 is applied to an i-th storage electrode line $S_i$ through the output terminal OP as a storage signal $Vs_i$. Thus, the state of the storage signal Vsi corresponds to a low level voltage V−.

When the gate-on voltage Von is applied to a (i+1)-th gate line $G_{i+1}$ after 1 H is passed, the transistors Tr1-Tr3 are turned on.

Thus, as shown in FIG. 9, while the transistor Tr1 is turned on, a high level voltage Vh2 of the third clock signal CK2 is applied to the storage electrode line $S_i$ through the output terminal OP as a storage signal $Vs_i$ such that the state of the storage signal $Vs_i$ is changed from a low level voltage V− to a high level voltage V+.

When an (i+1)-th gate signal is the gate-on voltage Von, the first clock signal CK1 maintains a low level voltage Vl1 and the second clock signal CK1B maintains a high level Vh1. As a result, the high level voltage Vh1 and the low level voltage Vl1 are applied to the control terminals of the transistors Tr5 and Tr4 through the turned on transistors Tr3 and Tr2, respectively, such that the transistor Tr5 is turned on and the transistor Tr4 is turned off. The capacitor C2 is also charged. Thus, while the (i+1)-th gate-on voltage Von is applied, the storage signal $Vs_i$ of the high level voltage V+ is applied to the output terminal OP through the turned on transistors Tr1 and Tr5. While the gate signal $g_{i+1}$ (which is applied to the (i+1)-th gate line $G_{i+1}$) maintains a gate-off signal Voff, the transistor Tr5 is turned on by the charging voltage of the capacitor C2. Accordingly, the high voltage AVDD is applied to the output terminal OP such that the storage signal $Vs_i$ maintains the high level voltage V+.

After the pixel row connected to the gate line $G_i$ has been charged by the application of the gate-on voltage Vo of the i-th gate signal $g_i$, a storage signal $Vs_i$ is changed from the low level voltage V− to the high level voltage V+, and a pixel electrode voltage Vp is increased by a voltage variation determined according to Equation 1 or Equation 2.

Like the operation of the i-th signal generating circuit $71_i$, as shown in FIG. 9, the transistor Tr6 is turned on such that the storage signal $Vs_{i+1}$ that is output from an (i+1)-th storage electrode line $S_{i+1}$ maintains a high level voltage V+ by the high level voltage Vh2 of the third clock signal CK2 through the turned on transistor Tr6 when a gate-on voltage Von is applied to an i-th gate signal $g_{i+1}$.

Next, while the gate-on voltage Von is applied to the (i+1)-th gate signal $g_{i+1}$, the transistors Tr1, Tr2, and Tr4 are turned on and the capacitor C1 is charged. Thus, the state of the storage signal $Vs_{i+1}$ is changed from the high level voltage V+ to the low level voltage V− by the low level voltage VI2 and the low voltage AVSS through the turned on transistors Tr1 and Tr4.

While the gate signal $g_{i+2}$ maintains a gate-off voltage Voff, the transistor Tr4 is turned on by the charged voltage into the capacitor C1. As a result, the low voltage AVSS is applied to the output terminal OP such that the storage signal $Vs_{i+1}$ maintains the low level voltage V−.

After the pixel row connected to a gate line $G_{i+1}$ is charged by the application of the gate-on voltage Vo of the (i+1)-th gate signal $g_{i+1}$, the storage signal $Vs_{i+1}$ is changed from the high level voltage V+ to the low level voltage V−, and a pixel electrode voltage Vp is decreased by a voltage variation determined according to Equation 1 or Equation 2.

The transistor Tr6 is a transistor for maintaining the voltage state of a storage signal applied to a corresponding storage electrode line. In one embodiment, the size of the transistor Tr6 is much smaller than the size of the transistor Tr1.

Figure 10:
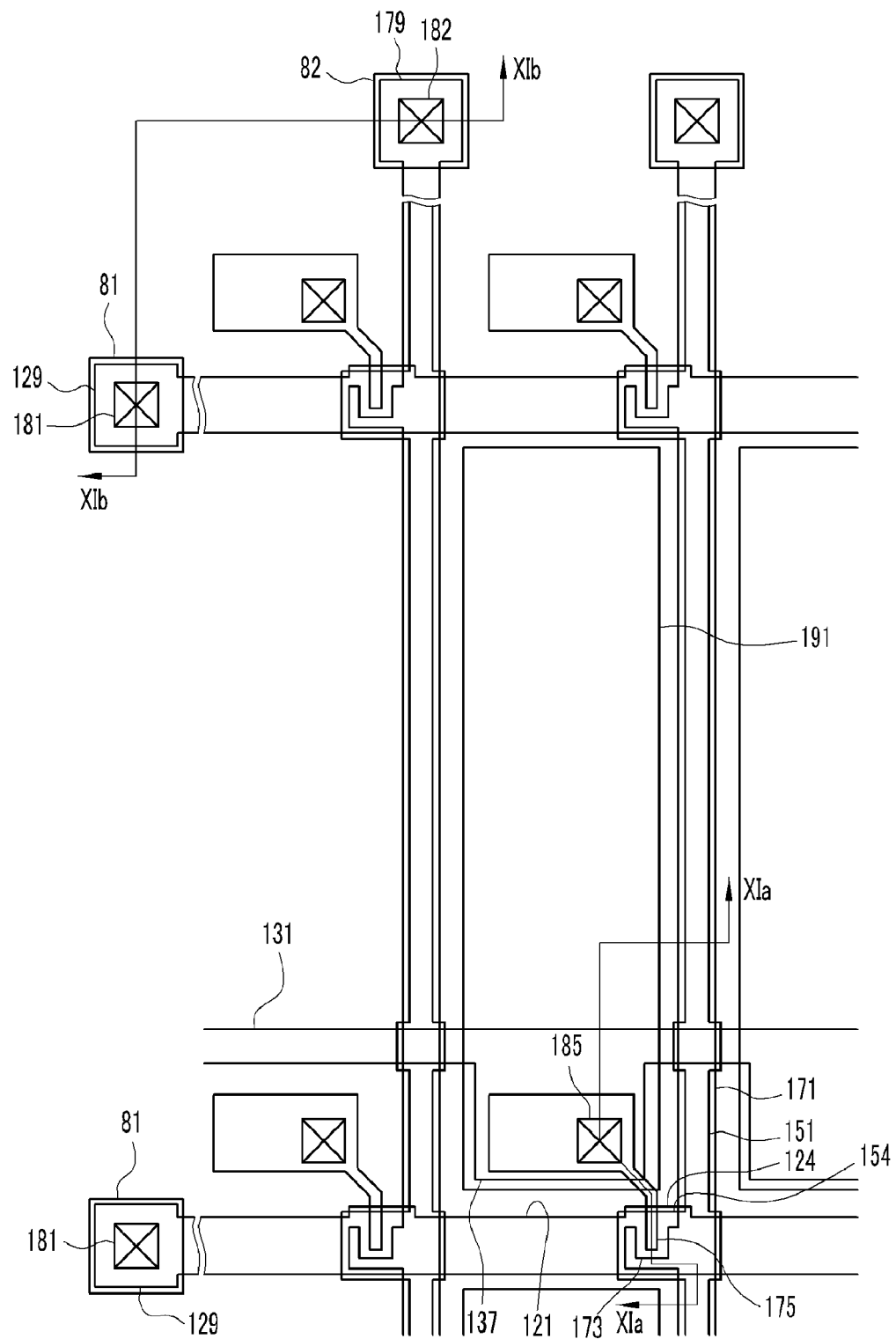
FIG. 10 is a layout view of a thin film transistor array panel of a liquid crystal display according to an embodiment of the invention.
Figure 11A:
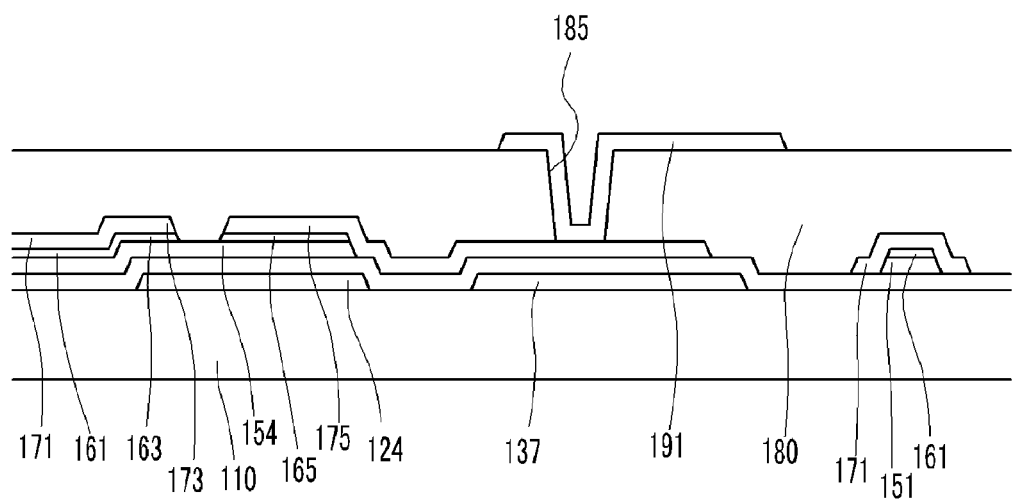
FIG. 11A and FIG. 11B are cross-sectional views of the thin film transistor array panel illustrated in FIG. 10, taken along lines XIA-XIA and XIB-XIB, respectively, according to an embodiment of the invention.
Figure 11B:
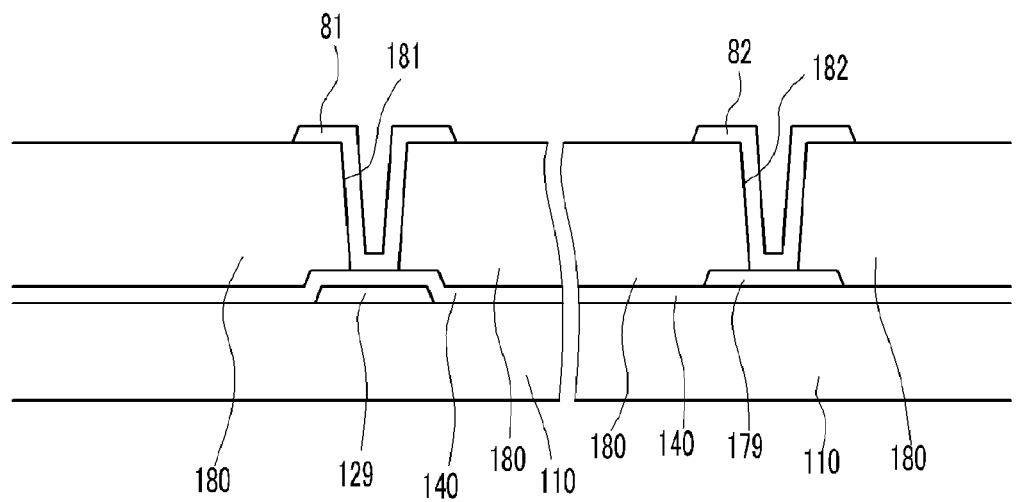

Referring to FIG. 10 to FIG. 11B, an example of a thin film transistor array panel of a liquid crystal display according to an embodiment of the invention is illustrated. FIG. 10 is a layout view of an example of a thin film transistor array panel according to an embodiment of the invention, and FIG. 11A and FIG. 11B are cross-sectional views of the thin film transistor array panel illustrated in FIG. 10 taken along lines XIA-XIA and XIB-XIB.

A plurality of gate lines 121 and a plurality of storage electrode lines 131 may be formed on an insulating substrate 110 formed of transparent glass or plastic. The gate lines 121 transfer gate signals and extend in a horizontal direction. Each of the gate lines 121 includes an end portion 129 having a large area for connecting a plurality of gate electrodes 124 that protrude downwardly to another layer or an external driving circuit.

A gate driving circuit (not shown) for generating a gate signal may be formed on a flexible printed circuit film (not shown) attached on the substrate 110, may be directly formed on the substrate 110, or may be integrated with the substrate 110. In the case that the gate driving circuit is integrated with the substrate 110, the gate lines 121 may extend and directly connect to the gate driving circuit.

Each of storage electrode lines 131 extends in a horizontal direction, and includes a plurality of enlarged portions 137. The storage electrode lines 131 include end portions having a large area in order to connect to another layer or an external driving circuit. Other shapes and arrangements of the storage electrode lines 131 may also be used.

Predetermined voltages, such as a high level voltage V+ of about 5V and a low level voltage V− of about 0V are alternatively applied to each of the storage electrode lines 131 on a frame by frame basis.

Signal generating circuits (not shown) for generating storage signals may be formed on a flexible printed circuit film (not shown) attached on the substrate 110, may be directly formed on the substrate 110, or may be integrated with the substrate 110. In the case that the signal generating circuits are integrated with the substrate 110, the storage electrode lines 131 may extend and connect to the signal generating circuits directly.

The gate lines 121 and the storage electrode lines 131 may be made from an aluminum-containing metal such as aluminum (Al) or an aluminum alloy, a silver-containing metal such as silver (Ag) or a silver alloy, a copper-containing metal such as copper (Cu) or a copper alloy, a molybdenum-containing metal such as molybdenum (Mo) or a molybdenum alloy, chromium (Cr), tantalum (Ta), or titanium (Ti). Alternatively, the gate lines 121 and the storage electrode lines 131 may have a multilayered structure having two conductive layers (not shown) with different physical properties. One of the conductive layers may be made from a metal having low resistivity, such as an aluminum-containing metal, a silver-containing metal, or a copper-containing metal, in order to reduce a signal delay or a voltage drop. The other conductive layer may be made from materials having excellent physical, chemical, and electrical contact characteristics with respect to other materials such as indium tin oxide (ITO) or indium zinc oxide (IZO). As an example, the other conductive layer may be made from a molybdenum-containing metal, chromium, tantalum, or titanium. As an exemplary combination, a combination of a chromium lower layer and an aluminum (alloy) upper layer may be used, or a combination of an aluminum (alloy) lower layer and a molybdenum (alloy) upper layer may be used. The gate lines 121 and the storage electrode lines 131 may be made from other metals or conductors.

The side surfaces of the gate lines 121 and storage electrode lines 131 may be inclined with respect to the surface of the substrate 110. In one embodiment, the angle may be, for example, about 30° to about 80°.

A gate insulating layer 140 made from silicon nitride (SiNx) or silicon oxide (SiOx) is formed on the gate lines 121 and the storage electrode lines 131.

A plurality of semiconductor stripes 151 made from hydrogenated amorphous silicon (amorphous silicon is abbreviated to a-Si) or polysilicon are formed on the gate insulating layer 140.

The semiconductor stripes 151 extend in a vertical direction, and include a plurality of protruding portions 154 protruded toward the gate electrode 124. The widths of the semiconductor stripes 151 are enlarged adjacent to the gate lines 121 and the storage electrode lines 131, and the semiconductor stripes 151 fully cover the gate lines 121 and the storage electrode lines 131.

A plurality of ohmic contact stripes 161 and a plurality of ohmic contact islands 165 are formed on the semiconductors 151. The ohmic contacts 161 and 165 may be made from materials such as, n+ hydrogenated amorphous silicon on which an n-type impurity is doped in a high concentration, or silicide. The ohmic contact stripes 161 include a plurality of protruding portions 163. Pairs composed of the protruding portions 163 and the ohmic contact islands 165 are disposed on the protruding portions 154 of the semiconductor stripes 151.

The side surfaces of the semiconductor stripes 151 and ohmic contacts 161 and 165 may be inclined with respect to the surface of the substrate 110. In one embodiment, the angle may be, for example, about 30° to about 80°.

The ohmic contact islands 165, a gate insulating layer 140, a plurality of data lines 171, and a plurality of drain electrodes 175 are formed on the ohmic contact stripes 161.

The data lines 171 transfer data signals and extend in a vertical direction while intersecting the gate lines 121 and the storage electrode lines 131. Each of the data lines 171 includes a plurality of source electrodes 173 extending toward a gate electrode 124 and an end portion 179 having a large area for connecting to another layer or an external driving circuit. A data driving circuit (not shown) for generating data signals may be formed on a flexible printed circuit film (not shown) attached on the substrate 110, may be directly installed on the substrate 110, or may be integrated with the substrate 110. In the case that the data driving circuit is integrated with the substrate 110, the data lines 171 may extend and connect to the data driving circuit.

The drain electrodes 175 are separated from the data lines 171 and face the source electrodes 173 with the gate electrode 124 between them. Each drain electrode 175 has one enlarged end portion and one end portion having a plate shape. The enlarged end portion overlaps with the enlarged portions 137 of the storage electrode lines 131, and the plate type end portion is surrounded with the curved source electrodes 173.

One gate electrode 124, one source electrode 173, and one drain electrode 175, along with the protruding portions 154 of the semiconductors 151, form one thin film transistor (TFT). The channel of the thin film transistor is formed on the protruding portions 154 between the source electrode 173 and the drain electrode 175.

The data lines 171 and the drain electrodes 175 may be formed from a refractory metal such as molybdenum, chromium, tantalum, titanium, or an alloy thereof. The data lines 171 and the drain electrodes 175 may have a multilayered structure of a refractory metal layer (not shown) and a low resistance conductive layer (not shown). Exemplary multilayered structures include a dual layer having a chromium or molybdenum (alloy) lower layer and an aluminum (alloy) upper layer, or a triple layer having a molybdenum (alloy) lower layer, an aluminum (alloy) middle layer, and a molybdenum (alloy) upper layer. The data lines 171 and the drain electrodes 175 may be made from other metals or conductors.

The side surfaces of the data lines 171 and drain electrodes 175 may be inclined with respect to the surface of the substrate 110. In one embodiment, the angle may be, for example, about 30° to about 80°.

The ohmic contacts 161 and 165 are located only between the semiconductors 151 and the data lines 171 and drain electrodes 175. The ohmic contacts 161 and 165, and reduce the contact resistance therebetween. In most locations, the semiconductor stripes 151 are narrower than the data lines 171. As described above, the widths of the semiconductor stripes 151 broaden where they meet the data lines, and exhibit a smooth surface, thereby preventing short circuits of the data lines 171. The semiconductors 151 have exposed portions, for example at the interfaces between the source electrodes 173 and the drain electrodes 175, or a portion that is not covered by the data lines 171 and the drain electrodes 175.

A passivation layer 180 is formed on the data lines 171, the drain electrodes 175, and the exposed portions of the semiconductors 151. The passivation layer 180 may be formed from an inorganic insulating material or an organic insulating material. The surface of the passivation layer 180 may be smooth. The inorganic insulating material may include, for example, silicon nitride or silicon oxide. The organic insulator may have photosensitivity, and the dielectric constant of the organic insulator may be about 4.0 or less. Alternatively, the passivation layer 180 may have a dual-layered structure of a lower inorganic layer and an upper organic layer in order to provide insulation as well as to prevent the exposed portions of the semiconductors 151 from being damaged.

A plurality of contact holes 182 and 185 are formed on the passivation layer 180, for respectively exposing the end portions 179 of the data lines 171 and the drain electrodes 175. A plurality of contact holes 181 for exposing the end portions 129 of the gate lines 121 are formed on the passivation layer 180 and the gate insulating layer 140.

A plurality of pixel electrodes 191 and a plurality of contact assistants 81 and 82 are formed on the passivation layer 180. The pixel electrodes 191 and the contact assistants 81 and 82 may be formed from a transparent conductive material such as ITO and IZO, or a reflective material such as aluminum, silver, chromium, or alloys thereof.

The pixel electrodes 191 physically and electrically connect to the drain electrodes 175 through the contact holes 185, and receive data voltages from the drain electrodes 175. The pixel electrodes 191 to which the data voltages are applied, along with another display panel (not shown) to which a common voltage is applied, form an electric field. The orientation of the liquid crystal molecules of the liquid crystal layer (not shown) between the two electrodes is determined by the electric field. The polarization of the light passing through the liquid crystal layer is changed according to the orientation of the liquid crystal molecules. A pixel electrode 191 and the common electrode form a liquid crystal capacitor and maintain the applied voltage after the thin film transistor is turned off.

The storage capacitor is formed by an overlap between the pixel electrode 191 and a drain electrode 175 that is electrically connected to the pixel electrode 191, and a storage line 131. The storage capacitor enhances the voltage storing capacity of the liquid crystal capacitor. The enlarged portions 137 of the storage electrode lines 131 increase the overlapped area, and accordingly, increase the storage capacity of the storage capacitor.

The contact assistants 81 and 82 connect to the end portions 129 of the gate lines 121 and the end portions 179 of the data lines 171 through the contact holes 181 and 182, respectively. The contact assistants 81 and 82 protect and facilitate the contact between the end portions 129 and 179 of the gate and data lines 121 and 171 and an external device.

Figure 12:
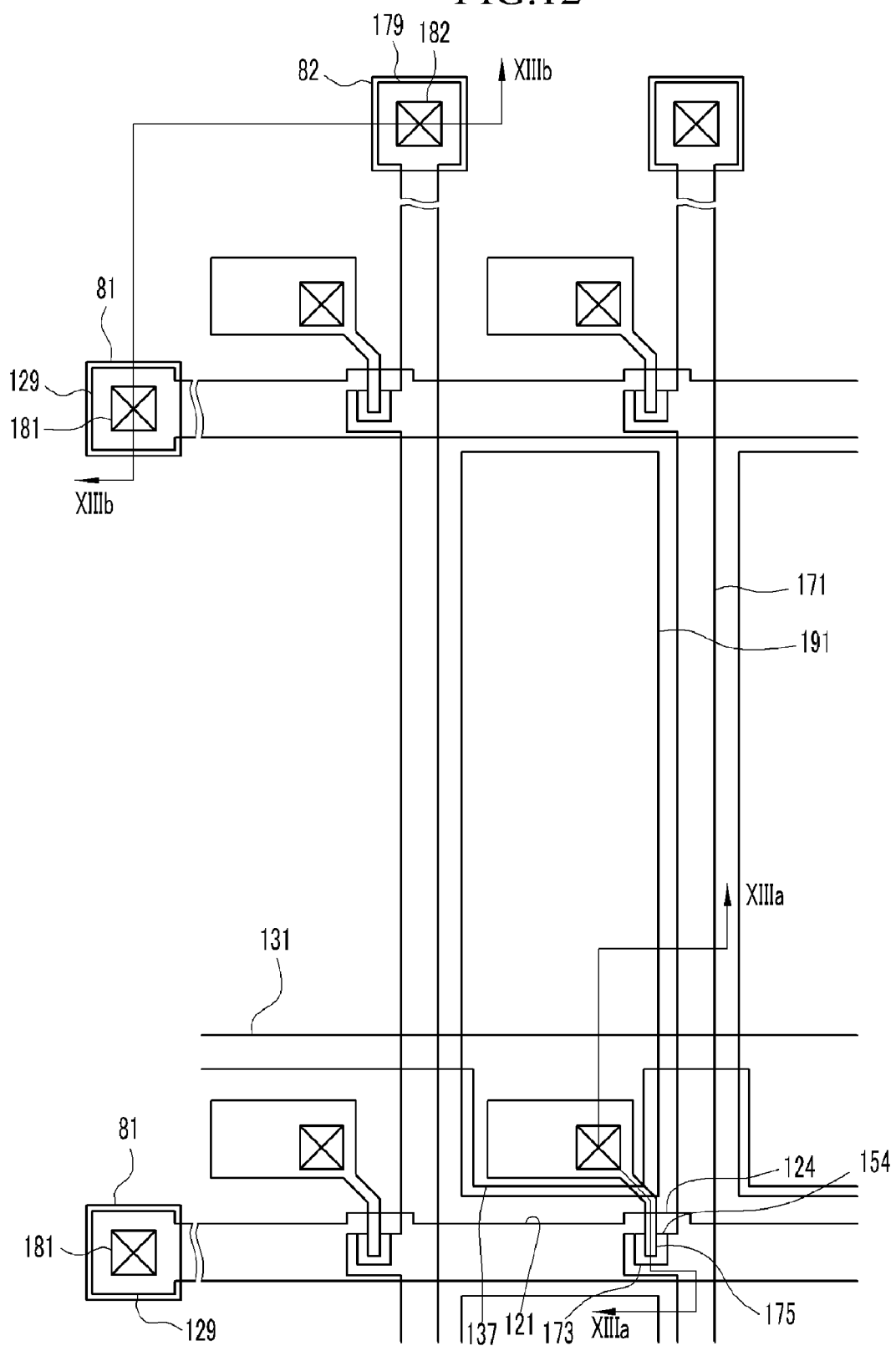
FIG. 12 is another layout view of a thin film transistor array panel of a liquid crystal display according to an embodiment of the invention.
Figure 13A:
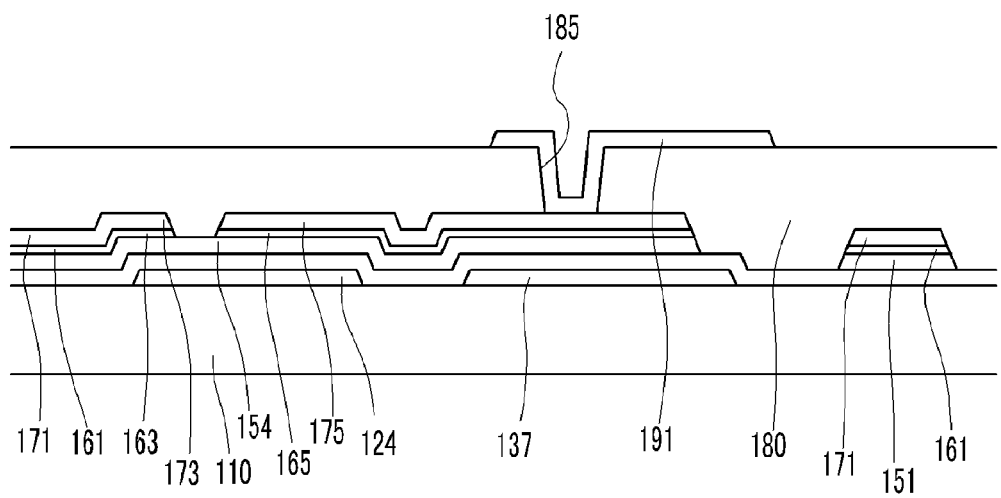
FIG. 13A and FIG. 13B are cross-sectional views of the thin film transistor array panel illustrated in FIG. 12, taken along lines XIIIA-XIIIA and XIIIB-XIIIB according to an embodiment of the invention.
Figure 13B:
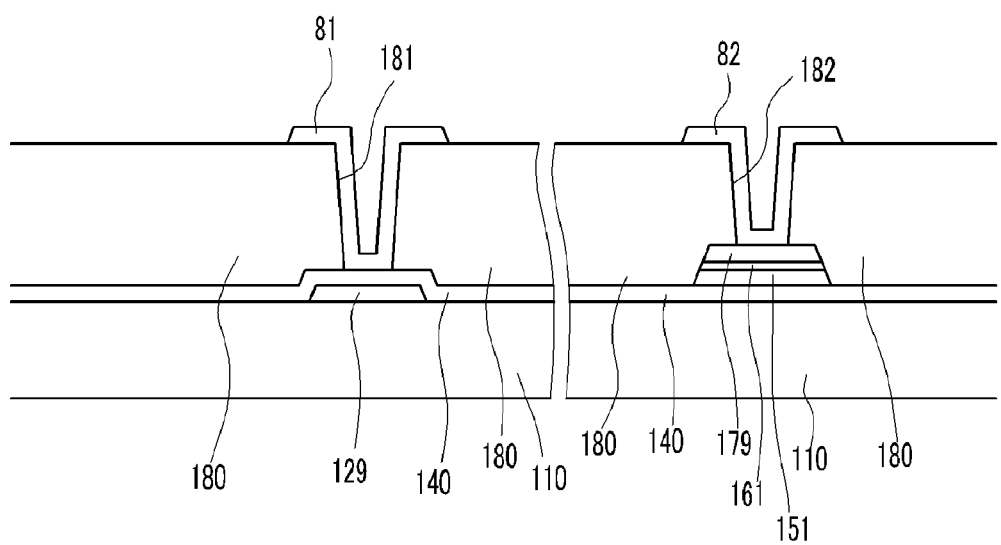

Referring to FIG. 12 to FIG. 13B, another example of a thin film transistor array panel according to exemplary embodiments of the present invention is illustrated in detail.

FIG. 12 is a layout view of a thin film transistor array panel of a liquid crystal display according to another embodiment of the invention, and FIG. 13A and FIG. 13B are cross-sectional views of the thin film transistor array panel illustrated in FIG. 12, taken along lines XIIA-XIIIA and XIIIB-XIIIB, respectively.

Another example of a thin film transistor array panel according to embodiments of the present invention has a similar structure to that of the thin film transistor array panel illustrated in FIG. 10 to FIG. 11B. A plurality of gate lines 121 having gate electrodes 124 and end portions 129, and a plurality of storage electrode lines 131 having a plurality of enlarged portions 137, are formed on a substrate 110. A gate insulating layer 140, a plurality of semiconductor stripes 151 having protruding portions 154, a plurality of ohmic contact stripes 161 having protruding portions 163, and a plurality of ohmic contact islands 165 are sequentially formed on the gate lines 121 and storage electrode lines 131. A plurality of data lines 171 having source electrodes 173 and end portions 179 and a plurality of drain electrodes 175 are formed on the ohmic contacts 161 and 165. A passivation layer 180 is formed on the data lines 171 and the drain electrodes 175. A plurality of contact holes 181, 182, and 185 are formed on the passivation layer 180 and the gate insulating layer 140, and a plurality of pixel electrodes 191 and a plurality of contact assistants 81 and 82 are formed on the contact holes 181 and 182.

In the thin film transistor array panel according to the present embodiment, unlike the thin film transistor array panel illustrated in FIG. 10 to FIG. 11B, the semiconductors 151, except the protruding portions 154 on which a thin film transistor is disposed, have surfaces substantially the same as those of the data lines 171, the drain electrodes 175, and the ohmic contacts 161 and 165 disposed under the data lines 171 and the drain electrodes 175. The semiconductor stripes 151 have unexposed portions disposed under the data lines 171, the drain electrodes 175, and the ohmic contacts 161 and 165, and exposed portions between the source electrodes 173 and the drain electrodes 175 that are not covered by the source electrodes 173 and the drain electrodes 175.

According to various embodiments of the invention, a common voltage is fixed at a predetermined voltage, and then a storage signal having a voltage that is changed by a predetermined period is applied to a storage electrode line. Different storage signals are applied to adjacent storage electrode lines. As a result, the range of a pixel electrode voltage and a pixel voltage is increased. Thus, the voltage range for representing grays is enlarged, and definition is improved.

A range of a pixel voltage generated in the case that the same range of data voltage is applied is larger than a range of a pixel voltage generated in the case that a storage signal of a predetermined value is applied. Thus, power consumption may be reduced. The power consumption may be further reduced because the common voltage is fixed at a predetermined value.

Further, a range of a pixel electrode voltage before a charging of liquid crystal is completed is larger than a range of a pixel electrode voltage after a charging of liquid crystal is completed. Thus, a voltage that is greater or lesser than a target voltage may be applied at a beginning of liquid crystal driving, and the response speed of the liquid crystal may be improved.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A display device comprising:
    a first gate line receiving a first gate signal;
    a storage electrode line; and
    a signal generating circuit connected to the first gate line and the storage electrode line;
    wherein the signal generating circuit comprises:
        a first transistor having a control terminal connected to the first gate line, an input terminal connected to a first control signal, and an output terminal connected to the storage electrode line;
        a second transistor having a control terminal connected to the first gate line and an input terminal connected to a second control signal; and
        a third transistor having a control terminal connected to the first gate line and an input terminal connected to a third control signal.

2. The display device of claim 1, wherein the first control signal and the third control signal have substantially the same phase, and the second control signal and the third control signal have substantially inverted phases.

3. The display device of claim 2, wherein the first, second, and third control signals have substantially the same period.

4. The display device of claim 3, wherein the first control signal and the third control signal each has a low level of voltage and the second control signal has a high level of voltage during the former half of the first gate signal.

5. The display device of claim 4, wherein the first control signal and the third control signal each has a high level of voltage and the second control signal has a low level of voltage during a latter half of the first gate signal.

6. The display device of claim 1, wherein the signal generating circuit further comprises:
    a fourth transistor having a control terminal connected to an output terminal of the third transistor, an input terminal connected to a first driving voltage, and an output terminal connected to the storage electrode line; and
    a fifth transistor having a control terminal connected to an output terminal of the second transistor, an input terminal connected to a second driving voltage, and an output terminal connected to the storage electrode line.

7. The display device of claim 6, wherein the first driving voltage is lower than the second driving voltage.

8. The display device of claim 7, wherein the first control signal and the third control signal have substantially the same phase, and the second control signal and the third control signal have substantially inverted phases.

9. The display device of claim 8, wherein the first, second, and third control signals have substantially the same period.

10. The display device of claim 9, wherein the first control signal and the third control signal each has a low level of voltage and the second control signal has a high level of voltage during the former half of the first gate signal.

11. The display device of claim 10, wherein the first control signal and the third control signal each has a high level of voltage and the second control signal has a low level of voltage during a latter half of the first gate signal.

12. The display device of claim 11, wherein the signal generating circuit further comprises:
    a first capacitor connected between the input terminal and the control terminal of the fourth transistor; and
    a second capacitor connected between the input terminal and the control terminal of the fifth transistor.

13. The display device of claim 12, wherein the first driving voltage is lower than the second driving voltage.

14. The display device of claim 13, wherein the first control signal and the third control signal have substantially the same phase, and the second control signal and the third control signal have substantially inverted phases.

15. The display device of claim 14, wherein the first, second, and third control signals have substantially the same period.

16. The display device of claim 15, wherein the first control signal and the third control signal each has a low level of voltage and the second control signal has a high level of voltage during the former half of the first gate signal.

17. The display device of claim 16, wherein the first control signal and the third control signal each has a high level of voltage and the second control signal has a low level of voltage during a latter half of the first gate signal.

18. The display device of claim 17, wherein the signal generating circuit further comprises a sixth transistor having an input terminal connected to the first control signal, a control terminal connected to a second gate line receiving a second gate signal previous to the first gate signal, and an output terminal connected to the storage electrode line.

19. The display device of claim 18, wherein the first gate signal overlaps the second gate signal.

20. The display device of claim 19, wherein a former half of the first gate signal overlaps a latter half of the second gate signal.

* * * * *